United States Patent
Mandai et al.

(10) Patent No.: US 8,340,533 B2
(45) Date of Patent: Dec. 25, 2012

(54) OPTICAL BALANCED RECEIVER AND IQ RECEIVER WITH BALANCED COMPENSATION

(75) Inventors: Kohei Mandai, Tokyo (JP); Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 12/485,574

(22) Filed: Jun. 16, 2009

(65) Prior Publication Data

US 2009/0317075 A1    Dec. 24, 2009

(30) Foreign Application Priority Data

Jun. 18, 2008   (JP) .................................. 2008-159183
Apr. 10, 2009   (JP) .................................. 2009-096048

(51) Int. Cl.
    *H04B 10/06*    (2006.01)
(52) U.S. Cl. ........................................ 398/208; 398/209
(58) Field of Classification Search .................... 398/208
    See application file for complete search history.

(56) References Cited

U.S. PATENT DOCUMENTS

| | | | | |
|---|---|---|---|---|
| 7,826,752 | B1 * | 11/2010 | Zanoni et al. .................. | 398/205 |
| 2006/0269294 | A1 | 11/2006 | Kikuchi | |
| 2008/0038001 | A1 * | 2/2008 | Becker et al. .................. | 398/204 |

FOREIGN PATENT DOCUMENTS

| | | |
|---|---|---|
| JP | 02-072335 | 3/1990 |
| JP | 09-093206 | 4/1997 |
| JP | 2006-217605 | 8/2006 |
| JP | 2006-339760 | 12/2006 |
| WO | WO 2008/038337 A1 | 4/2008 |

OTHER PUBLICATIONS

Seimetz, "Phase Diversity Receivers for Homodyne Detection of Optical DQPSK Signals", Journal of Lightwave Technology, vol. 24, No. 9, Sep. 2006.
Furuta et al., "Balance type Photodiode Module Technique", NTT Technology Journal 2007. 11, pp. 58-61.

\* cited by examiner

*Primary Examiner* — Danny Leung

(74) *Attorney, Agent, or Firm* — Antonelli, Terry, Stout & Kraus, LLP.

(57) ABSTRACT

An optical balanced receiver including an optical coupler for combining input optical information signal and optical reference signal and outputting two optical interfering signals whose phases are opposite to each other, two photodetectors for receiving the two optical interfering signals and outputting detection signals as electrical signals having the amplitudes corresponding to the interference intensities of the received optical interfering signals, a balance compensation type difference device for compensating an intensity fluctuation component added to a difference signal of the two detection signals due to the difference in amplitude and/or delay between the detection signals output from the two photodetectors in accordance with an input control signal, and outputting the compensated difference signal of the two detection signals, and a control circuit for outputting the control signal to the balance compensation type difference device.

5 Claims, 27 Drawing Sheets

OPTICAL BALANCED RECEIVER AND IQ RECEIVER WITH BALANCED COMPENSATION

CLAIM OF PRIORITY

The present application claims priority from Japanese patent application JP 2008-159183 filed on Jun. 18, 2008 and JP 2009-096048 filed on Apr. 10, 2009, the contents of which are hereby incorporated by reference into this application.

BACKGROUND OF THE INVENTION

1. Field of the Invention

The present invention relates to an optical balanced receiver and an IQ receiver with balanced compensation, and particularly to an optical balanced receiver and an IQ receiver with balanced compensation for compensating or correcting distortion of waveforms of received signals due to degradation in the output balance between two photodetectors of an optical balanced receiver in optical information transmission using optical fibers.

2. Description of the Related Art

Optical multilevel modulation which is being promoted to be practically used from the viewpoint of the frequency efficiency is improved in receiver sensitivity by using an optical balanced receiver for optical phase detection.

FIG. 1 shows an example of the construction of an optical balanced receiver. The optical balanced receiver 100 comprises an optical coupler 101, two photodetectors (O/E) 102, 103 and a difference device 104. The optical coupler 101 combines waves of an optical information signal 201 and an optical reference signal 202 and outputs two optical interfering signals 203 and 204 whose phases are opposite to each other. The optical interfering signals 203 and 204 are received by photodetectors 102 and 103 respectively and converted to detection signals 205 and 206 having the amplitudes corresponding to the interference intensities thereof. The difference device 104 obtains the difference between the two detection signals 205 and 206 and outputs it as a received signal 207.

FIG. 2 shows an example of the construction of using this optical balanced receiver 100 for differential phase detection. In this construction, the optical coupler 101 shown in FIG. 1 is substituted by an optical delayed interferometer 301 having an optical splitter 302 and the optical coupler 101. In the optical delayed interferometer 301, the input optical information signal 201 is split into an optical information signal 305 and an optical reference signal 306 by the optical splitter 302, and these two signals are subjected to a differential delay of an integral multiple of a signal period and any phase shift by using an optical delay line 303 and an optical phase shifter 304. Thereafter, these signals are combined with each other in the optical coupler 101. The optical delay line 303 and the optical phase shifter 304 may be disposed in any one of respective transmission paths for the optical information signal 305 and the optical reference signal 306.

In this optical balanced receiver 100, two paths passing through the optical detectors 102 and 103 respectively and extending from the output terminal of the optical coupler 101 to the difference device 104 are balanced to each other in loss and delay amount (hereinafter collectively referred to as "receiver balance"), whereby the common components of the two optical interfering signals 203 and 204 are offset by each other and an intensity fluctuation component contained in the optical information signal 201 or the optical reference signal 202 is removed from the received signal 207. The receiver sensitivity and the delay amount of the two photodetectors 102 and 103 are also contained in the receiver balance.

For example, the relation between the receiver balance and the degradation of the receiver sensitivity when the optical information signal 201 is subjected to Quadrature Phase Shift Keying is disclosed in FIG. 9 of "Phase Diversity Receivers for Homodyne Detection of Optical DQPSK Signals", Journal of Lightwave Technology, vol. 24, No. 9, September 2006 (hereinafter referred to "non-patent document 1"). In the case of DQPSK (Differential Quadrature Phase Shift Keying), the receiver sensitivity is degraded by about 1 dB when the sensitivity ratio of photodetectors is equal to 10% or the difference in path length of the photodetectors is equal to several millimeters. This degradation is more remarkable in optical multilevel modulation in which the multilevel number is increased, such as optical 8-phase shift keying, quadrature amplitude modulation or the like.

Furthermore, there are disclosed a method of inserting an attenuator at the output side of the optical coupler or the photodetector so that the receiver balance can be adjusted (for example, see JP-A-2006-217605; hereinafter referred to as "patent document 1"), and an optical balanced receiver constructed by an offset-compensation affixed difference device and an offset control circuit (for example, see "Balance type Photodiode Module Technique", NTT Technology Journal 2007. 11, pp 58-61; hereinafter referred to as "non-patent document 2").

SUMMARY OF THE INVENTION

In order to optimize the receiver balance, it is necessary to discriminate and combine the optical coupler 101 and the photodetectors 102 and 103 shown in FIG. 1, and thus there is a problem that the number of manufacturing steps increases and the yield decreases. Furthermore, aged deterioration of the photodetectors 102 and 103 which deteriorates the receiver balance is also problematic.

As shown in FIG. 3, in the technique disclosed in the patent document 1, for example, optical attenuators 111 and 112 and attenuators 113 and 114 are inserted at the output sides of the optical coupler 101 and the photodetectors 102 and 103, whereby the loss balance of two paths from the optical coupler 101 to the difference device 104 can be adjusted. However, new devices such as the optical attenuators, etc. are installed into the optical balanced receiver, and thus the path length is increased, which induces a problem that it is difficult to adjust the path length difference. Furthermore, a method of observing two optical interfering signals 203 and 204 or two detection signals 205 and 206 and compensating for the balance of the amplitude and delay amount of these signals may be available in the above construction. However, this method has a problem that it is impossible to correct unbalance occurring in the difference device 104.

Furthermore, as shown in FIG. 4, for example, an optical balanced receiver 100 constructed by an offset-compensation affixed difference device 121 and an offset control circuit 122 is disclosed in the non-patent document 2. In this construction, an offset control circuit 122 for observing a received signal 207 outputs an offset signal 208 to the offset-compensation affixed difference device 121, and the offset-compensation affixed difference device 121 adds the difference between the input two detection signals 205 and 206 with a constant offset corresponding to a control signal 208, and outputs the addition resultant signal as a received signal 207. The offset control circuit 122 varies the control signal 208 so that the average value or median value of the received signal 207 reaches a threshold value, thereby compensating the offset of the received signal 207 which is varied due to degradation of the receiver balance. However, the offset of the received signal 207 varies at a high speed in accordance with the instantaneous intensity fluctuation of the optical information signal 201 and the optical reference signal 202 when the receiver balance is degraded. In this construction, the offset to be added to the received signal 207 is a constant value, and thus there is a problem that it is impossible to perfectly compensate for the degradation of the receiver balance.

The present invention has been implemented in view of the foregoing problems, and has an object to provide an optical balanced receiver that compensates or corrects degradation of a received signal which is induced when receiver balance is degraded in an optical balanced receiver.

The present invention has another object to automatically compensate or correct receiver balance of an optical balanced receiver by using electrical signal processing.

The present invention has a further object to make it unnecessary to exchange or add a device constituting an optical balanced receiver even when the receiver balance of the optical balanced receiver is degraded due to production tolerance or aged deterioration of the device concerned.

In order to attain the above objects, in an optical balanced receiver equipped with an optical coupler or an optical coupler of a 180° optical hybrid for combining an input optical information signal with an optical reference signal and outputting two optical interfering signals whose phases are opposite to each other, two photodetectors for receiving the two optical interfering signals output from the optical coupler and outputting detection signals as electrical signals having the amplitudes corresponding to the interference intensities, and a difference device for obtaining the difference between the two detection signals and outputting a received signal, the received signal or the two detection signals are subjected to digital signal processing, and degradation of the received signal caused by the difference in amplitude and/or delay (delay amount) between the two detection signals of the optical balanced receiver is compensated or corrected by using a balance compensation difference device which is obtained by providing the difference device with an analog-to-digital (A/D) converter for outputting an input electrical signal as a quantized and digitized digital signal and a digital signal processor for subjecting the digital signal to arithmetic processing. The digital signal processing can easily implement complicated calculations, and thus it is effective to the compensation or correction of the degradation of the received signal which requires complicated calculations. When the digital signal processing can be replaced with analog signal processing, the A/D converter may be omitted.

According to a first aspect of the present invention, there is provided an optical balanced receiver comprising: an optical coupler for combining input optical information signal and optical reference signal and outputting two optical interfering signals whose phases are opposite to each other; two photodetectors for receiving the two optical interfering signals, converting the optical interfering signals to electrical signals having the amplitudes corresponding to the interference intensities and outputting the electrical signals as detection signals; a balance compensation difference device for compensating for the difference in amplitude and/or delay between the two detection signals in accordance with an input control signal, and outputting the difference between the compensated two detection signals as a received signal; and a control circuit for generating the control signal and outputting the control signal to the balance compensation difference device.

According to a second aspect of the present invention, there is provided an optical balanced receiver comprising: first and second optical power monitors for receiving input optical information signal and optical reference signal, converting both the signals to electrical signals having the amplitudes corresponding to the intensities of the input signals (light) and outputting the electrical signals as detection intensity signals to the control circuit; a splitter for splitting the optical information signal to two signals and outputting each split optical information signal to each of the first optical power monitor and the optical balanced receiver; and a splitter for splitting the optical reference signal to two signals and outputting each split optical reference signal to each of the second optical power monitor and the optical balanced receiver.

According to a third aspect of the present invention, there is provided an optical receiver comprising: the two optical balanced receivers described above; a first splitter for splitting an input optical information signal and outputting the split input optical information signal to each of the two optical balanced receivers; and a second splitter for splitting an optical reference signal and outputting the split optical reference signal to each of the two optical balanced receiver, wherein the optical couplers of the two optical balanced receivers have interference phases which are orthogonal to each other, and combines the input optical information signal and optical reference signal while the phases thereof are made different from each other by 90°.

According to a fourth aspect of the present invention, there is provided an optical receiver comprising: two optical balanced receivers; a control circuit for generating a control signal and outputting the control signal to the two optical balanced receivers; a first splitter for splitting an optical information signal and outputting the split optical information signal to each of the two optical balanced receivers; and a second splitter for splitting an optical reference signal and outputting the split optical reference signal to each of the two optical balanced receiver, wherein each of the two optical balanced receivers has an optical coupler for combining the input optical information signal and optical reference signal and outputting two optical interfering signals whose phases are opposite to each other, two photodetectors for converting the interference intensities of the two optical interfering signals to respective electrical signals and outputting the electrical signals as detection signals, and a balance compensation difference device for compensating or correcting the difference in amplitude and/or delay between the two detection signals in accordance with an input control signal, and outputting the difference between the two compensated or corrected detection signals as a received signal, the optical couplers of the two optical balanced receivers have interference phases orthogonal to each other and combines the input optical information signal and optical reference signal while the phases thereof are made different from each other by 90°, and the control circuit calculates an intensity component of the optical information signal or an approximate component of the intensity component concerned from output signals of the balance compensation difference devices of the two optical balanced receivers, and generates the control signal on the basis of the calculated intensity component or approximate component and the output signals.

According to the present invention, there can be provided an optical balanced receiver that can compensate or correct degradation of a received signal even when a different loss or a delay difference occurs in the two paths from the two output terminals of the optical coupler to the difference device, that is, the receiver balance is degraded in the optical balanced receiver. Furthermore, according to the present invention, the compensation can be performed while the difference in optical detection sensitivity between the photodetectors is further taken into consideration.

According to the present invention, the receiver balance of the optical balanced receiver can be automatically compensated by using the electrical signal processing. Therefore, even when the receiver balance is degraded due to the production tolerance and aged deterioration of devices such as photodetectors, optical waveguides, etc. constituting the optical balanced receiver, it is unnecessary to exchange or add the devices concerned.

DETAILED DESCRIPTION OF THE PREFERRED EMBODIMENTS

Preferred embodiments according to the present invention will be described hereunder with reference to the accompanying drawings.

[Outline]

Figure 5:
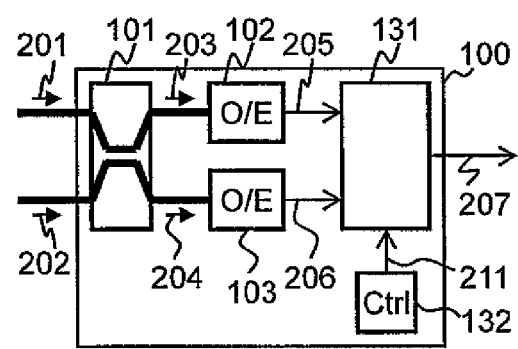
FIG. 5 is a diagram showing the basic construction of an optical balanced receiver according to the present invention.

FIG. 5 schematically shows an optical balanced receiver to describe the principle of an embodiment.

An optical balanced receiver 100 has an optical coupler 101, photodetectors 102 and 103, a balance compensation type difference device 131 and a control circuit (Ctrl) 132, for example.

The optical coupler 101 of the optical balanced receiver 100 combines an input optical information signal 201 with an optical reference signal 202 and outputs optical interfering signals 203 and 204 whose phases are opposite to each other. For example, an optical coupler or a 180° optical hybrid may be used as the optical coupler 101. The optical interfering signals 203 and 204 are input to different photodetectors 102 and 103, converted to electrical signals having the amplitudes corresponding to the interference intensities thereof and then output as detection signals 205 and 206.

Normally, the two detection signals 205 and 206 are input to a difference device for obtaining the difference therebetween. However, according to this embodiment, the two detection signals 205 and 206 are input to a balance compensation type difference device 131 which is obtained by mounting an analog-to-digital (A/D) converter for performing quantization and digitization of an electrical signal, that is, analog-to-digital conversion and a digital signal processor for executing digital processing on a digital signal in the difference device. The balance compensation type difference device 131 obtains the difference between the two input detection signals 205 and 206, and also it compensates or corrects the difference in amplitude and/or delay amount between the detection signals 205 and 206 in accordance with a control signal 211 and outputs the compensated or corrected difference resultant signal as a received signal 207. The control signal 211 is generated by a control circuit (Ctrl) 132 so as to eliminate the waveform distortion of the received signal 207 caused by the difference in amplitude and/or delay amount between the two detection signals 205 and 206. The amplitude of each of the detection signals 205 and 206 described above means the pulse height value of each signal, however, it also contains the meaning of an average signal intensity or an offset value.

Each embodiment of the optical balanced receiver will be described hereunder in detail.

First Embodiment

Figure 6:
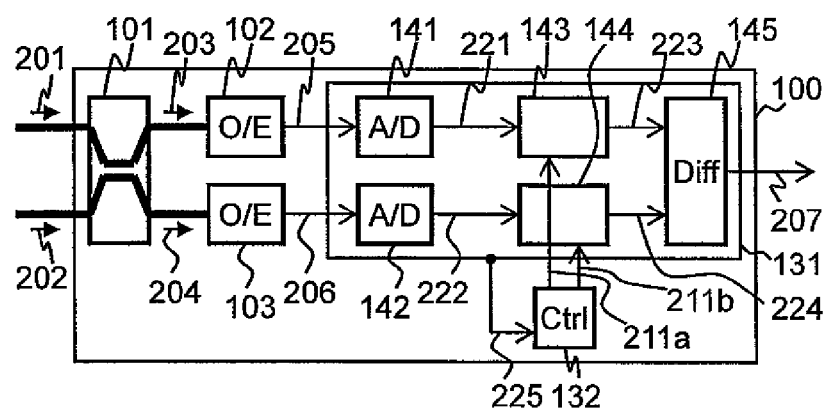
FIG. 6 is a diagram showing the construction of a first embodiment of the present invention.

FIG. 6 shows a first construction example of the optical balanced receiver.

The balance compensation type difference device 131 of the optical balanced receiver 100 has analog-to-digital (A/D)

converters 141 and 142, digital signal processors 143 and 144 and a digital difference device 145, for example.

In the optical balanced receiver 100 of this embodiment, an optical information signal 201 and an optical reference signal 202 are input to an optical coupler 101. The optical coupler 101 combines the optical information signal 201 and the optical reference signal 202, and outputs two optical interfering signals 203 and 204 whose phases are opposite to each other. The optical interfering signals 203 and 204 are received by photodetectors 102 and 103 respectively, converted to detection signals 205 and 206 having the amplitudes corresponding to the interference intensities of the respective optical interfering signals and then output. The detection signals 205 and 206 are input to the balance compensation type difference device 131.

In the balance compensation type difference device 131, the detection signals 205 and 206 are quantized and digitalized by two analog-to-digital (A/D) converters 141 and 142 which are synchronized with each other in sampling timing, and output as digital detection signals 221 and 222. The sampling timing may be conformed with a sampling clock from a clock generator, for example.

In the following description, it is assumed that the sampling timing of the A/D converters 141, 142 is synchronized with the modulation frequency of the detection signals 205 and 206, and digital detection signals 221 and 222 are digital signals which are digitalized by only one sample per symbol. However, even when the sampling timing of the A/D converters 141 and 142 is arbitrary, the digital detection signals 221 and 22 described above can be obtained through digital signal processing such as timing extraction or the like.

The difference in amplitude and/or delay between the digital detection signals 221 and 222 is compensated by the digital signal processors 143 and 144 in accordance with control signals 211a and 211b, and output as compensated digital detection signals 223 and 224. The digital difference device 145 obtains the difference between the compensated digital detection signals 223 and 224, and outputs it as a received signal 207 as an output signal of the balance compensation type difference device 131 and the optical balanced receiver 100. The control circuit 132 observes the amplitudes and/or delays (delay amounts) of the digital detection signals 221 and 222, for example, and outputs the control signals 211a and 211b so that the difference between the amplitudes and/or the difference between the delays (delay amounts) vanishes. In some cases, the control circuit 132 observes the compensated digital detection signals 223 and 224 or the received signal 207 in place of the digital detection signals 221 and 222 in each construction described below. In FIG. 6, these observed signals are collectively represented as an observation signal 225.

Next, the balance compensation type difference device 131 and the control circuit 132 for compensating or correcting the difference in amplitude between the detection signals 205 and 206 will be described.

Figure 1:
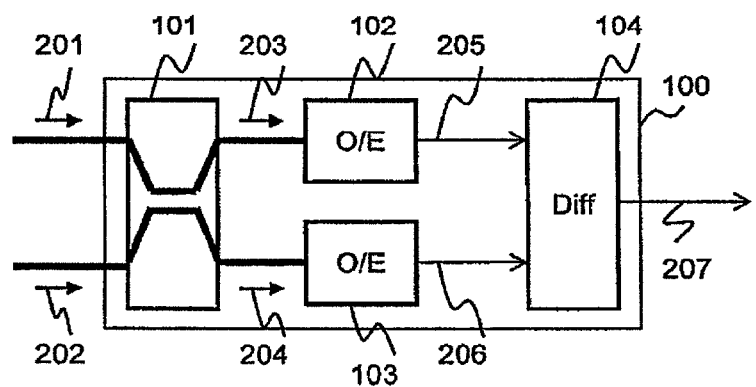
FIG. 1 is a diagram showing the basic construction of an optical balanced receiver.
Figure 2:
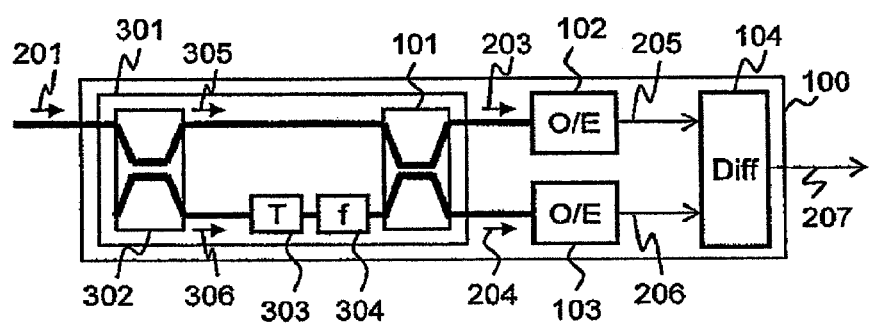
FIG. 2 is a diagram showing the basic construction of an optical balanced receiver used for differential phase detection.
Figure 3:
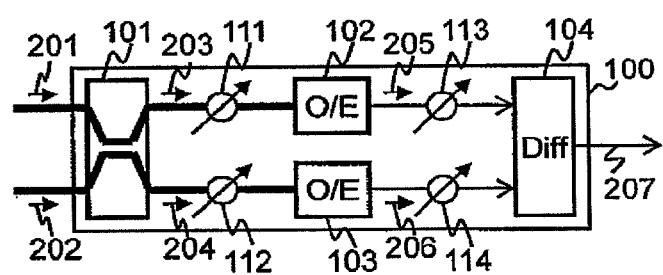
FIG. 3 is a diagram showing the principle of a conventional optical balanced receiver.
Figure 4:
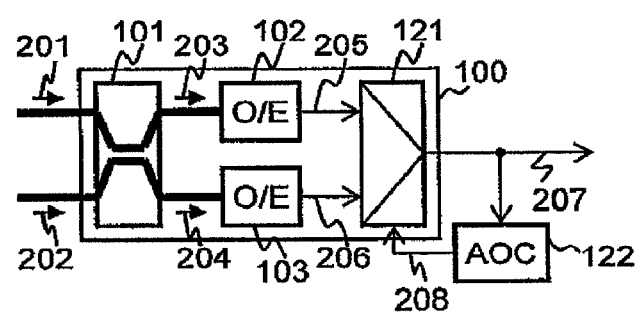
FIG. 4 is a diagram showing the principle of the conventional optical balanced receiver.

In the optical balanced receiver 100 shown in FIG. 1, the optical electric-fields of the optical information signal 201 and the optical reference signal 202 can be represented by $E_S(t)\cos(\omega_S t+\phi_S(t))$, $E_R(t)\cos(\omega_R t+\phi_R(t))$, respectively. Here, t represents a variable representing the time, and (t) means a function of t. Here, when the formulas: $\omega_F=\omega_S-\omega_R$ and $\phi_F(t)=\phi_S(t)-\phi_R(t)$ are provided and the interference phase of the optical coupler 101 is represented by $\phi$, the detection signals 205 and 206 output from the two photodetectors 102 and 103 are represented by the following mathematical formulas $S_1$ and $S_2$:

$$S_1=2E_S(t)E_R(t)\cos(\omega_F t+\phi_F(t)-\phi)+[E^2_S(t)+E_R^2(t)] \quad \text{[Formula 1]}$$

$$S_2=-2E_S(t)E_R(t)\cos(\omega_F t+\phi_F(t)-\phi)+[E^2_S(t)+E_R^2(t)] \quad \text{[Formula 2]}$$

An intensity fluctuation noise caused by intensity components $E_S^2(t)$, $E_R^2(t)$ of the optical information signal 201 and the optical reference signal 202 is commonly contained in the second terms of the formula 1 and the formula 2. The optical balanced receiver obtains the difference between the detection signals 205 and 206 by using the difference device 104 to offset this intensity fluctuation noise, thereby enhancing the receiver sensitivity. Accordingly, the received signal 207 output from the difference device 104 is represented by the following mathematical formula $S_D$:

$$S_D=4E_S(t)E_R(t)\cos(\omega_F t+\phi_F(t)-\phi) \quad \text{[Formula 3]}$$

When the detection signals 205 and 206 are subjected to different attenuations or amplifications to be multiplied by A and B respectively and then input to the difference device 104, the received signal 207 output from the difference device 104 is represented by the following mathematical formula $S_d$:

$$S_d=2(A+B)E_S(t)E_R(t)\cos(\omega_F t+\phi_F(t)-\phi)+(A-B)[E_S^2(t)+E_R^2(t)] \quad \text{[Formula 4]}$$

There is a difference between the amplitudes of the two detection signals 205 and 206. In the case of A≠B, the intensity fluctuation noise component $(A-B)[E_S^2(t)+E_R^2(t)]$ at the second term of the formula 4 is not eliminated, but added to the received signal 207. This component varies with the time change of amplitudes of the optical electric-fields $E_S(t)$ and $E_R(t)$ of the optical information signal 201 and the optical reference signal 202. This is the degradation of the received signal 207 which occurs due to the amplitude difference of the detection signals 205 and 206.

In order to compensate or correct this degradation, the control circuit 132 of FIG. 6 observes the amplitudes of the digital detection signals 221 and 222, outputs the control signals 211a and 211b so that these amplitudes are equal to each other, and operates the digital signal processors 143 and 144.

Figure 7:
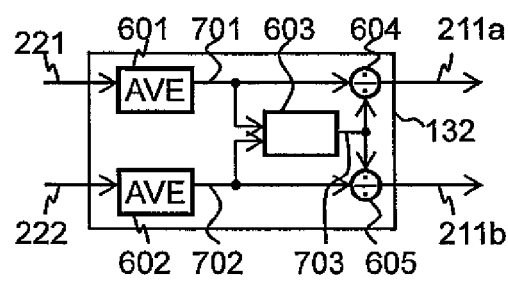
FIG. 7 is a diagram showing the construction of an embodiment of a control circuit 132 of the present invention.

FIG. 7 shows an example of the construction of the control circuit 132 when the amplitudes of the detection signals 221 and 222 is compensated or corrected.

The control circuit 132 has time average circuits 601 and 602, an average calculating circuit 603 and dividers 604 and 605, for example. The digital detection signals 221 and 222 are input as observation signals 225 into the control circuit 132, and the time average values of the respective observation signals are calculated in the time averaging circuits 601 and 602 and output as detection signal amplitude values 701 and 702. These detection signal amplitude values 701 and 702 are input to the average calculating circuit 603, and the average value of the two detection signal amplitude values is output as a reference amplitude value 703 to the dividers 604 and 605. The detection signal amplitude values 701 and 702 described above are also input to the dividers 604 and 605 so that each of the detection signal amplitude values 701 and 702 is divided by the reference amplitude value 703, and the ratio of each of the detection signal amplitude values 701 and 702 to the reference amplitude value 703 is output as the control signal 211a, 211b. It is not necessarily required to calculate the reference amplitude value 703 by using the average calculating circuit 603, and any constant or another value such as the detection signal amplitude value 701 or the like may be used.

In the optical balance receiver 100 (FIG. 6) having the control circuit 132, the digital signal processors 143 and 144 are functioned as dividers, for example. If the input digital detection signals 221 and 222 are divided by the control signals 211a and 211b respectively and output as the compensated digital detection signals 223 and 224, both the time averages of the amplitudes of the compensated digital detection signals 223 and 224 are equal to the value of the reference amplitude value 703, so that the difference in amplitude between the digital detection signals 221 and 222 is compensated. The amplitudes of the compensated digital detection signals 223 and 224 correspond to the value of the reference amplitude value 703 input to the dividers 604 and 605 in the control circuit 132. When the detection signal amplitude value 701 is used as the reference amplitude value 703, the digital signal processor 143 is not required to adjust the amplitude of the digital detection signal 221, and thus the divider 604 and the digital signal processor 143 can be omitted.

Furthermore, if one of the optical information signal 201 and the optical reference signal 202 of FIG. 6 is quenched and the other is set to continuous light, the optical coupler 101 splits the continuous light into two signals in power ratio of 1:1 and then outputs the split signals. Accordingly, if the receiver balance is not degraded, the digital detection signals 221 and 222 have amplitudes which are fixed temporally and equal to each other. In this case, the detection signal amplitude values 701 and 702 calculated in the control circuit 132 of FIG. 7 are equal to the digital detection signals 221 and 222, respectively. Accordingly, when an optical balanced receiver is not put into practice, for example, when the optical balanced receiver is manufactured or when the optical balanced receiver is started up before it is put into practice, the time averaging circuits 601 and 602 can be omitted by quenching one of the optical information signal 201 and the optical reference signal 202 and setting the other to continuous light.

The control circuit 132 of FIG. 7 uses the digital detection signals 221 and 222 as the observation signals 225 to execute feedforward control for compensating the digital detection signal. However, feedback control may be executed by using the compensated digital detection signals 223 and 224 as the observation signals 225. In this case, it is required to change the control circuit 132 to a control circuit for feedback control. However, the control circuit 132 can be easily changed on the basis of the control engineering, and it can be implemented according to the style of this embodiment. For example, the difference between each of the control signals 211a and 211b output from the control circuit 132 and the numerical value 1 as a convergence value of these control signals is subjected to time-integration, and each of the time-integration results is added with "1" and input as the control signal 211a, 211b into the digital signal processor.

The construction of the control circuit 132 described above is an embodiment, and another embodiment may be used insofar as the ratio of the control signals 211a and 211b corresponds to the amplitude ratio of the digital detection signals 221 and 222. For example, the maximum value and the pulse height value of each of the digital detection signals 221 and 222 are proportional to the amplitude thereof, and thus a maximum value calculating circuit for outputting the maximum value of an input signal or a pulse height value calculating circuit for outputting a pulse height value may be substituted for the time averaging circuits 601 and 602. For example, the pulse height value calculating circuit calculates the maximum value and the minimum value of the input signal and outputs the difference between the maximum and minimum values, whereby this embodiment can be implemented.

The optical balanced receiver 100 of FIG. 6 may be equipped with a DC cut such as a high-frequency pass filter or the like at the output terminal of the photodetector 102, 103. In this case, the DC offset components of the detection signals 205 and 206 input to the A/D converters 141 and 142 are removed. Therefore, both the time average values of the digital detection signals 221 and 222 approach to zero irrespective of the degradation of the receiver balance, and thus there is a case where the control cannot be performed by the control 132 of FIG. 6. In such a case, it is effective to set the time averaging circuits 601 and 602 as the maximum value calculating circuit and the pulse height value calculating circuit.

Next, the balance compensation type difference device 131 and the control circuit 132 for compensating or correcting the difference in delay amount between the detection signals 205 and 206 will be described. In the optical balanced receiver 100 of FIG. 6, the control circuit 132 observes the delay amounts of the digital detection signals 221 and 222, and outputs the control signals 211a and 211b for operating the digital signal processors 143 and 144 so that the difference between the delay amounts is equal to zero.

Figure 8:
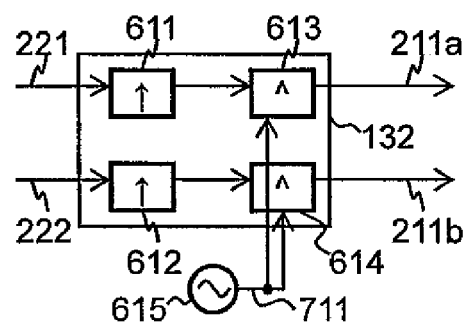
FIG. 8 is a diagram showing the construction of an embodiment of the control circuit 132 of the present invention.

FIG. 8 shows an example of the construction of the control circuit 132 when the delay amount is compensated.

The digital detection signals 221 and 222 input to the control circuit 132 are input to up-sampling circuits 611 and 612 respectively to be increased in sampling number per unit time, and then output from the up-sampling circuits 611 and 612. These two output signals are input to peak detection circuits 613 and 614, respectively. A sampling clock 711 output from a clock generator 615 is also input to the peak detection circuits 613 and 614. The sampling clock 711 is input to the A/D converters 141 and 142 of FIG. 6, and the A/D converters 141 and 142 digitalize the detection signals 205 and 206 in synchronism with the sampling clock. The peak detection circuit 613, 614 outputs the time lag between the input signal input thereto and the peak of the waveform of the sampling clock 711 is output as the control signal 211a, 211b.

According to the sampling theorem, a signal digitalized at a sampling frequency which is not more than the double of the maximum frequency of a signal before the digitalization cannot be restored to the signal before the digitalization. Each of the up-sampling circuits 611 and 612 is a circuit for restoring the signal before the digitalization from the input signal and re-sampling the signal. Therefore, in order to restore the detection signals 205 and 206 from the digital detection signals 221 and 222, the sampling frequency of the A/D converter 141, 142 of FIG. 6 must be twice or more as high as the frequency component contained in the detection signal 205, 206. In general, the frequency components contained in the detection signals 205 and 206 are not more than half of the modulation speed (symbol rate) of the optical information signal 201 and the optical reference signal 202, and thus the sampling frequencies of the A/D converters 141 and 142 are set to the symbol rate or more. However, it should be noted that the frequency components contained in the detection signals 205 and 206 vary in the case of some modulation formats of the optical information signal 201 and the optical reference signal 202. For example, when the optical information signal 201 is subjected to RZ modulation, the detection signals 205 and 206 contain the frequency component of the symbol rate, and thus it is necessary to set the sampling frequencies of the A/D converters 141 and 142 to the double of the symbol rate.

Figure 9:
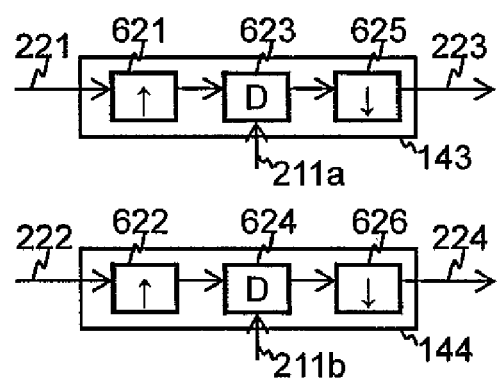
FIG. 9 is a diagram showing the construction of an embodiment of digital signal processors 143, 144 of the present invention.

FIG. 9 shows an example of the construction of the digital signal processors 143 and 144 of the optical balanced receiver 100 of FIG. 6 which corresponds to the control circuit 132.

In the digital signal processors 143 and 144, the up-sampling circuits 621 and 622 first increase the sampling numbers per unit time of the digital detection signals 221 and 222 and then output these signals. These outputs are input to digital delay circuits 623 and 624, and delayed by the delay amounts corresponding to the control signals 211a and 211b, respectively. These delayed digital signals are input to down-sampling circuits 625 and 626, returned to signals of the same sampling rates as the digital detection signals 221 and 222 and then output as compensated digital detection signals 223 and 224.

Here, in the control circuit 132 of FIG. 8 and the digital signal processor 143 of FIG. 9, when the sample numbers per unit time of the digital signals output from the up-sampling circuits 611 and 621 are set to be equal to each other and the control circuit 132 counts the delay difference between the digital signal waveform output from the up-sampling circuit 611 and sampling clock 711 by using the sampling number to generate the control signal 211a, the digital delay circuit 623 may delay the digital signal input thereto by only the sampling number indicated by the control signal 211a.

The control circuit 132 described above can compensate a delay smaller than the modulation period (symbol period) of the detection signal 205, 206 out of the delay of the detection signal 205, 206.

The control circuit 132 of FIG. 8 executes the feedforward control in which the digital detection signals 221 and 222 are used as the observation signal 225. However, the compensated digital detection signals 223 and 224 may be used as the observation signal 225 to execute the feedback control.

Furthermore, when there is a time lag in sampling timing between the detection signal 205, 206 and the A/D converter 141, 142, the detection signal 205, 206 which is displaced in timing from the waveform peak is converted to the digital detection signal 221, 222, and thus the average value of the amplitude of the digital detection signal 221, 222 decreases. Therefore, the delay difference of the detection signals 205 and 206 could be corrected if the amplitudes of the digital detection signals 221 and 222 are controlled to be maximized.

Figure 10:
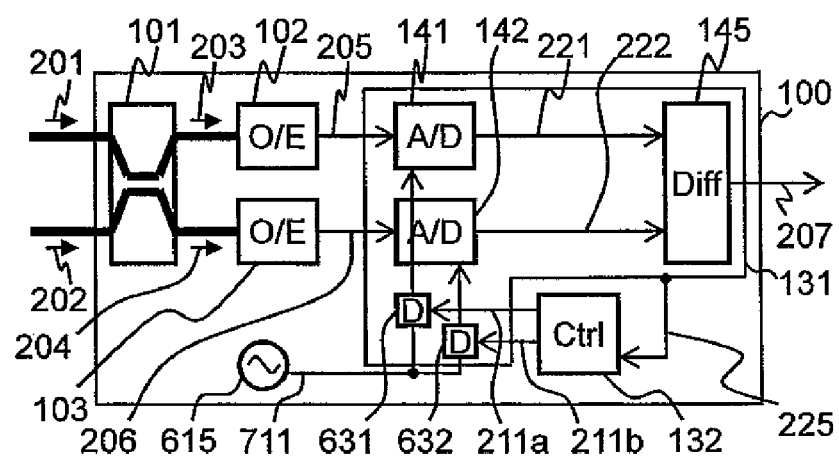
FIG. 10 is a diagram showing an example (2) of the construction of the first embodiment according to the present invention.

FIG. 10 shows a second example of the construction of the optical balanced receiver 100 for compensating the delay difference of the detection signals 205 and 206.

In this embodiment, delay lines 631 and 632 for delaying the sampling clock 711 output from the clock generator 615 in accordance with the control signals 211a and 211b to compensate the delay difference of the detection signals 205 and 206. The construction of the control circuit 132 is similar to that of FIG. 8.

Figure 11:
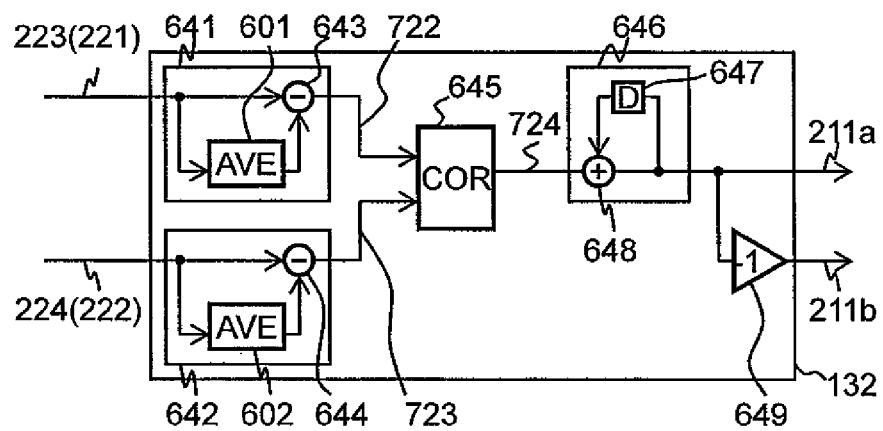
FIG. 11 is a diagram showing the construction of an embodiment of the control circuit 132 of the present invention.

Next, FIG. 11 shows an example of the construction of the control circuit 132 for correcting a delay difference larger than the symbol period of the detection signals 205 and 206. The overall construction of the optical balanced receiver 100 is similar to those of FIGS. 6 and 10, for example.

The compensated digital detection signals 223 and 224 input to the control circuit 132 are first input to DC removing circuits 641 and 642. The DC removing circuit 641, 642 has a time averaging circuit 601, 602 and a subtracter 643, 644, for example. The DC removing circuit 641, 642 calculates the time average value, that is, the DC component of the compensated digital detection signal 223, 224 by using the time averaging circuit 601, 602, subtracts the calculated time average value from the compensated digital detection signal 223, 224 by using the subtracter 643, 644, and outputs the AC component of the compensated digital detection signal 223, 224 as an AC digital detection signal 722, 723. The AC digital detection signals are input to a correlator 645, and the correlator 645 outputs a signal having some fixed value as a correlation signal 724 until the correlation between the AC digital detection signals 722 and 723 exceeds a threshold value, for example. This correlation signal 724 is time-integrated in an integrator 646, and the time-integration result is output as a control signal 211a. Furthermore, the control signal 211a whose sign is inverted in an inverter 649 is also output as a control signal 211b.

In the optical balanced receiver 100 of FIG. 6, the control signals 211a and 211b are input to the digital signal processors 143 and 144, and the digital detection signals 221 and 222 are delayed the delay amounts corresponding to the control signals 211a and 211b. In the optical balanced receiver 100 of FIG. 10, the control signals 211a and 211b are input to the delay lines 631 and 632 respectively, and the sampling clocks input to the A/D converters 141 and 142 are delayed the delay amounts corresponding to the control signals 211a and 211b. Furthermore, in this construction, the optical balanced receiver 100 can operate even when one of the control signals 211a and 211b is omitted.

In place of the compensated digital detection signals 223 and 224, the digital detection signals 221 and 222 before the compensation may be input to the control circuit 132. In this case, the AC digital detection signals 722 and 723 may be delayed each other, and the delay amount when the correlation signal 724 exceeds the threshold value or reaches the maximum value may be output as the control signal 211a.

For example, the correlator 645 may measure the correlativity between two input signals by calculating the convolution integral (convolution) of the two signal. It may output "zero" as the correlation signal 724 only when the correlation is obtained, and also output a non-zero value as the correlation signal 724 when no correlation is obtained.

Another style may be adopted for the correlator 645 insofar as it can measure correlativity. For example, the difference between the square mean values of the input signals is calculated, and only when the difference concerned exceeds a fixed threshold value, a non-zero value is output as the correlation signal 724. The values of the control signals 211a and 211b vary if the correlation signal 724 is not equal to zero, and the control signals become constant when the correlation signal 724 is set to zero. Therefore, the delay amounts of the digital signal processors 143 and 144 are fixed to values when the compensated digital detection signals 223 and 224 are correlated with each other.

A mechanism for compensating a delay smaller than the symbol period described above is applicable to the construction of the optical balanced receiver 100 for compensating the delay of the detection signals 205 and 206 by using the control signals 211a and 211b output from the control circuit 132 of FIG. 11. For example, the optical balanced receiver 100 having the digital signal processors 143 and 144 shown in FIG. 6 and the optical balanced receiver 100 having the delay lines 631 and 632 for delaying the sampling clock 711 of FIG. 10 may be used.

Next, a case where the received signal 207 is set as the observation signal 225 and the amplitude ratio of the detection signals 205 and 206 is compensated will be described. When there is some difference in amplitude between the detection signals 205 and 206, an offset of the received signal 207 which is caused by the intensities of the optical information signal 201 and the optical reference signal 202 occurs due to the residual intensity fluctuation noise component of the second term of the formula 4, and a bias occurs in the histogram distribution of the received signal 207. Therefore, the control circuit 132 observes the histogram distribution of the amplitude of the received signal 207, outputs the control signals 211a and 211b so that the bias of this distribution vanishes, and operates the digital signal processors 143 and 144.

Figure 12:
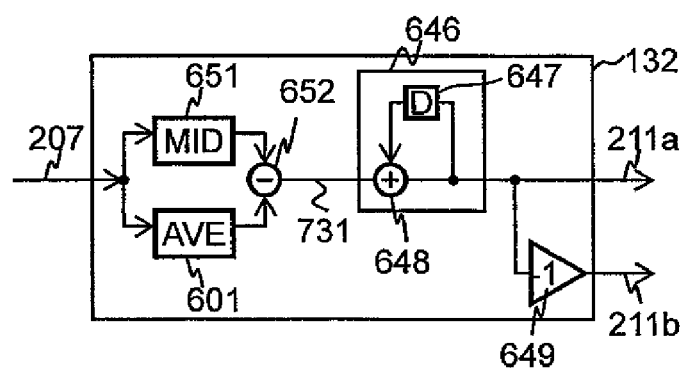
FIG. 12 is a diagram showing the construction of an embodiment of the control circuit 132 of the present invention.

FIG. 12 shows an example of the construction of the control circuit 132.

In this construction, the received signal 207 is input to a median value calculating circuit 651 and a time averaging circuit 601, and the median value and the time average value of the received signal 207 are output. The median value and the time average value are input to a subtracter 652, and the difference between the median value and the time average value is output as a difference signal 731. The difference signal 731 is time-integrated in the integrator 646, and output as the control signal 211a. Furthermore, the control signal 211a is input to the inverter 649, and the control signal 211b which is inverted in sign from the control signal 211a is output. For example, the integrator 646 delays the control signal 211a to be output by one sample in a one-sample delay line 647, adds the one-sample delayed control signal 211a with the input difference signal 731 in an adder 648, and then outputs the addition resultant signal as the control signal 211a.

The digital signal processors 143 and 144 of the optical balanced receiver 100 (FIG. 6) having this control circuit 132 are multipliers, for example. Each multiplier multiplies the input digital detection signal 221, 222 by the value corresponding to the control signal 211a, 211b and outputs the compensated digital detection signal 223, 224. With this construction, the difference in amplitude between the digital detection signals 221 and 222 is compensated so that the difference between the median value and the time average value of the amplitude of the received signal 207 vanishes.

When the optical balanced receiver 100 of FIG. 6 is equipped with a DC cut such as a high-frequency pass filter or the like at the output terminal of the photodetector 102, 103, the DC offset components of the detection signals 205 and 206 input to the A/D converters 141 and 142 are removed, and thus the time average of the received signal 207 is equal to zero. However, the bias of the histogram distribution of the received signal 207 which occurs due to the amplitude difference of the detection signals 205 and 206 is not removed, and thus the control circuit 132 of FIG. 12 can be also used in this case.

These control circuits 132 and the digital signal processors 143 and 144 which compensate the difference in amplitude and/or delay between the detection signals 205 and 206 are connected to one another in parallel or in series, and the amplitude and the delay can be compensated all together. Furthermore, when the feedback control is used in these control circuits 132, the maximum/minimum control can be used, however, no limitation is imposed to the algorithm thereof. A general method such as a climbing method, a maximum inclination method, a univariable or multivariable control method such as dithering of a control signal or the like may be used, for example.

Second Embodiment

Figure 13:
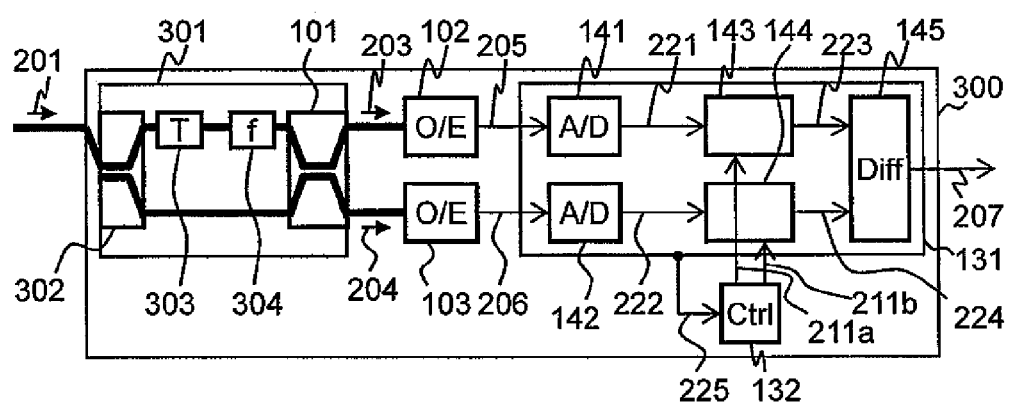
FIG. 13 is a diagram showing the construction of a second embodiment of the present invention.

FIG. 13 shows a construction example of an optical delay detection type optical balanced receiver 300.

The difference from the optical balanced receiver 100 shown in FIG. 6 is what an optical delayed interferometer 301 is used for the optical coupler 101. In the optical delayed interferometer 301, the optical information signal 201 input to the optical delayed interferometer 301 is split to two signals in the optical splitter 302. One of the split optical signals is input to a delay line 303 and an optical phase shifter 304 so as to be subjected to a fixed delay and a phase shift. Thereafter, the two split optical signals are combined with each other in the optical coupler 101, and output as two optical interfering signals 203 and 204 which are opposite to each other in phase. The following construction of the optical coupler 101 is the same as the first construction example of the optical balanced receiver 100 described above. Furthermore, The following construction of the optical coupler 101 may be designed as in the case of the second construction example of the optical balanced receiver 100 described above.

In this construction, when the optical electric-field of the optical information signal 201 is represented by $2^{1/2}E_S(t)\cos(\omega_S t+\phi_S(t))$, the time delay amount of the optical delay line 303 is represented by T, the interference phase of an interferometer 101 which can be adjusted by the optical phase shifter 304 is represented by $\phi$ and also $\phi_F(t)=\phi_S(t)-\phi_S(t-T)$, the detection signals 205 and 206 are represented by the following mathematical formulas $S_1$ and $S_2$:

$$S_1 = 2E_S(t)E_S(t+T)\cos(\phi_F(t)-\phi) + [E_S^2(t)+E_S^2(t+T)] \quad \text{[Formula 5]}$$

$$S_2 = 2E_S(t)E_S(t+T)\cos(\phi_F(t)-\phi) + [E_S^2(t)+E_S^2(t+T)] \quad \text{[Formula 6]}$$

Accordingly, the difference between the detection signals 205 and 206 is represented by the following mathematical formula $S_D$:

$$S_D = 4E_S(t)E_S(t+T)\cos(\phi_F(t)-\phi) \quad \text{[Formula 7]}$$

Here, when the time delay amount T of the optical delay line 303 is the modulation period (symbol period) of the optical information signal 201, the phase difference (differential phase) from the modulation symbol before one symbol can be detected. In the case of this construction, no optical reference signal is required, and thus there is an advantage that polarization control and phase tracking of the optical reference signal are not required.

However, when the detection signals 205 and 206 are subjected to different attenuations or amplifications to be multiplied by A and B respectively, the difference between the detection signals 205 and 206 is represented by the following mathematic formula $S_d$, and the intensity fluctuation noise is added to the second term as in the case of the first embodiment.

$$S_d = 2(A+B)E_S(t)E_S(t+T)\cos(\phi_F(t)-\phi) + (A-B)[E_S^2(t)+E_S^2(t+T)] \quad \text{[Formula 8]}$$

In this construction, with respect to the optical information signal 201 which is subjected to the delay and the phase shift by the optical delay line 303 and the optical phase shifter 304, the other signal is used as the optical reference signal 202 of FIG. 6. Therefore, the control circuit 132 and the digital signal processors 143 and 144 which are designed to have the same construction as the first embodiment can be used. Furthermore, the optical balanced receiver for compensating the delay of the detection signals 205 and 206 may be designed so that the optical delayed interferometer 301 is used as the optical coupler 101 of the optical balanced receiver shown in FIG. 10.

Third Embodiment

Figure 14:
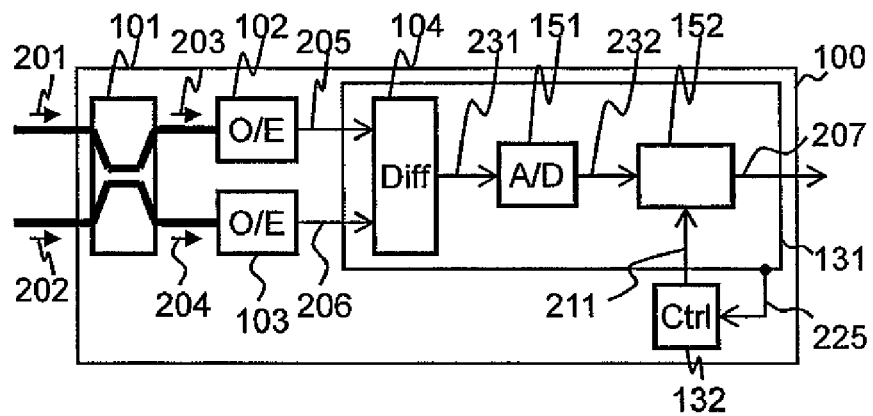
FIG. 14 is a diagram showing the construction of a third embodiment of the present invention.

FIG. 14 shows a third construction example of the optical balanced receiver 100.

The optical balanced receiver 100 of this embodiment is different from the first embodiment in the construction of the balance compensation type difference device 131. In this construction, the detection signals 205 and 206 output from the two photodetectors 102 and 103 are first input to the difference device 104 of the balance compensation type difference device 131. In this balance compensation type difference device 131, the difference device 104 obtains the difference between the detection signals 205 and 206 and outputs the difference resultant signal as a difference signal 231. An A/D converter 151 quantizes and digitalizes this difference signal 231 and outputs a digital difference signal 232. The digital difference signal 232 is subjected to the amplitude compensation corresponding to the control signal 211 by a digital signal processor 152, and output as a received signal 207. The control circuit 132 may control the digital signal processor 152 so that the amplitude histogram distribution of the difference signal 231 is uniform. When the amplitude histogram distribution is non-uniform, a DC component appears in the received signal 207. Therefore, the digital signal processor 152 may be controlled so that the DC component vanishes. An example of the construction of the control circuit 132 in this case will be described hereunder.

The control circuit 132 observes the digital difference signal 232 or the received signal 207 output from the balance compensation type difference device 131 as an observation signal 225, and outputs a control signal 211. For example, when the digital difference signal 232 is set as the observation signal 225, the control circuit 132 is set as an averaging circuit for calculating the time average value of the digital difference signal 232 and outputting the calculated time average value as the control signal 211, and the digital signal processor 152 is set as a subtracter for subtracting the control signal 211 from the digital difference signal 232, a signal obtained by subtracting the DC component from the difference signal 231 can be output as the received signal 207. Furthermore, the control signal 211 may be generated so that the bias of the amplitude histogram distribution vanishes.

The difference signal 231 is represented by the formula 4, and in a general optical communication system, $\phi_F(t)$ corresponding to transmission information varies randomly, and thus the time average value at the first term of the formula 4 is substantially equal to zero. Therefore, the time average value of the difference signal 232 is equal to the time average value of the intensity fluctuation noise component $(A-B)[E_S^2(t)+E_R^2(t)]$ at the second term of the formula 4. This is the DC component removed from the received signal 207 in this construction.

However, the intensity fluctuation noise component varies along with the time change of amplitudes of the optical electric-fields $E_S(t)$, $E_R(t)$ of the optical information signal 201 and the optical reference signal 202, and thus it cannot be perfectly removed in this embodiment.

In this construction, the feedback control may be performed with the received signal 207 set as the observation signal 225.

Furthermore, in this construction, the optical delayed interferometer 301 of the second embodiment may be used as the optical coupler 101, for example.

Fourth Embodiment

Figure 15:
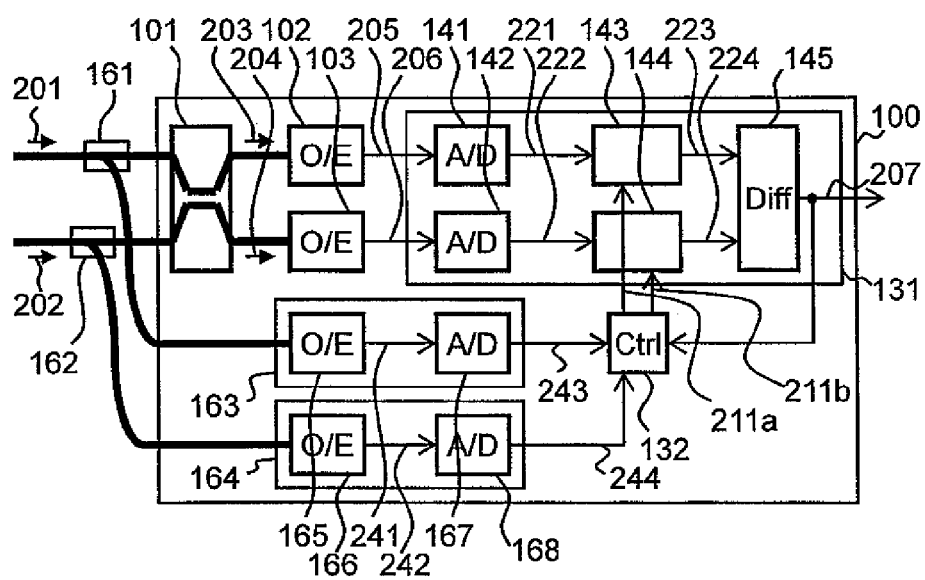
FIG. 15 is a diagram showing the construction of a fourth embodiment of the present invention.

FIG. 15 shows a fourth construction example of the optical balanced receiver 100.

In the optical balanced receiver 100 of this construction, the optical balanced receiver of the first construction described above (see FIG. 6) is further provided with optical power monitors 163 and 164. In this construction, the optical information signal 201 and the optical reference signal 202 are respectively split into respective two signals by optical splitters 161 and 162 such as optical couplers or the like. The split two optical information signals 201 are input to the optical coupler 101 and the optical power monitor 163. Likewise, the split two optical reference signals 202 are input to the optical coupler 101 and the optical power monitor 164. In the optical power monitors 163 and 164, photodetectors 165 and 166 receive input optical signals and output, as detection intensity signals 241 and 242, electrical signals whose amplitudes are dependent on the intensities of the input optical signals. The detection intensity signals 241 and 242 are respectively quantized and digitalized in A/D converters 167 and 168, and output as digital intensity signals 243 and 244 to the control circuit 132. The construction from the optical coupler 101 to the output side of the received signal 207 is the same as the first construction described above, for example. When both the optical information signal 201 and the optical reference signal 202 are modulated signals, it is required to equalize the delay amounts which have been imposed until the two optical signals are input to the optical coupler 101.

In this construction, the delays of the detection signals 205 and 206 can be compensated as in the case of the first embodiment, for example. When the delays of the detection intensity signals 241 and 242 are compensated, for example, it may be desired that the optical information signal 201 and the optical reference signal 202 are subjected to intensity modulation and the modulation timings of the detection intensity signals 241 and 242 can be detected. However, if the sampling timings of the four A/D converters 141, 142, 167 and 168 are made coincident with the modulation timing of the optical information signal 201 or the optical reference signal 202, it would be unnecessary to compensate the delays of the detection signals 205 and 206 and the detection intensity signals 241 and 242. As this method is known a method of perfectly matching the four path lengths from the optical splitters 161 and 162 to the A/D converters 141, 142, 167 and 168, or a method of delaying the four signals through the digital signal processing to match the timings. The power ratio of the optical splitters 161 and 162 is arbitrary, and it is not necessarily required to set 1:1. However, it is desired that they have the same power ratio.

The detection intensity signals 241 and 242 are represented by the following mathematic formulas $S_{A1}$, $S_{A2}$:

$$S_{A1} = E_S^2(t) \qquad \text{[Formula 9]}$$

$$S_{A2} = E_R^2(t) \qquad \text{[Formula 10]}$$

The amplitude ratio between the detection intensity signal 241, 242 and the detection signals 205 and 206 can be adjusted by adjusting the split ratio of the optical splitters 161 and 162, or by multiplying the digital intensity signals 243 and 244 by a proper value.

When an amplitude difference occurs between the detection signals 205 and 206, the received signal 207 is represented by the formula 4. The first term of this formula varies randomly in accordance with the phase $\phi_F(t)$ representing information, and thus the time average of the formula 4 is the time average of the intensity fluctuation noise component $(A-B)[E_S^2(t)+E_R^2(t)]$ of the second term of the formula 4. Furthermore, the sum of the detection intensity signals 241 and 242 represented by the formula 9 and the formula 10 is represented by $[E_S^2(t)+E_R^2(t)]$. Therefore, the time average of the received signal 207 is divided by the time average of the sum of the digital intensity signals 243 and 244, whereby the amplitude difference (A−B) between the detection signals 205 and 206 can be calculated.

Figure 16:
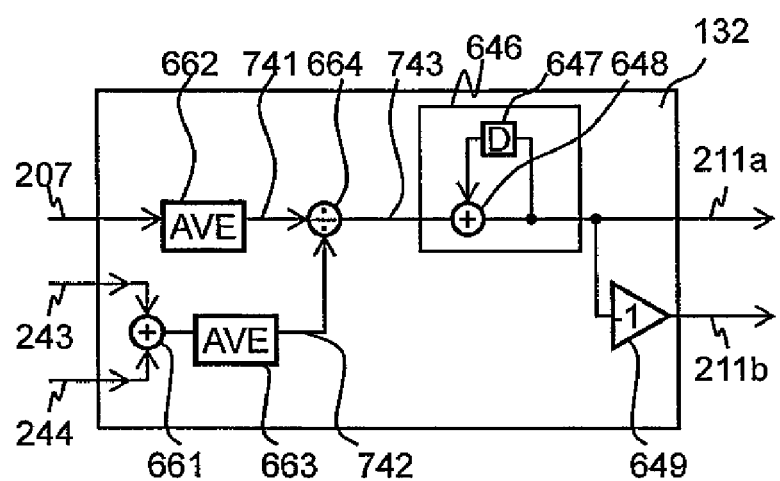
FIG. 16 is a diagram showing the construction of an embodiment of the control circuit 132 of the present invention.

FIG. 16 shows an example of the construction of the control circuit 132 for compensating the amplitude difference between the detection signals 205 and 206 by using the above principle.

The sum of the digital intensity signals 243 and 244 input to the control circuit 132 is calculated in an adder 661, and then the time average of the sum concerned is achieved in an averaging circuit 663 and output as an average intensity fluctuation noise signal 742. The time average of the input received signal 207 is obtained in an averaging circuit 662, and output as an average received signal 741. The average received signal 741 and the average intensity fluctuation noise signal 742 are input to a divider 664, and an amplitude difference signal 743 which is obtained by dividing the average received signal 741 by the average intensity fluctuation noise signal 742 is output from the divider 664. This correspond to (A−B) of the formula 4. The amplitude difference signal 743 is input to the integrator 646 having the digital delay line 647, the adder 648, etc. to be time-integrated, and then output as the control signal 211a from the control circuit 132. Furthermore, the control signal 211a whose sign is inverted in the inverter 649 is also output as the control signal 211b from the control circuit 132.

In the optical balanced receiver 100 of FIG. 15 which has the control circuit 132 of this construction, the digital signal processors 143 and 144 are set as dividers, and the digital signals 221 and 222 are divided by signals which are obtained by adding the control signals 211a and 211b with "1" respectively, and output as the compensated digital detection signals 223 and 224. By this construction, the amplitude difference between the detection signals 205 and 206 can be compensated.

When amplitude of the optical electric-field $E_R(t)$ of the optical reference signal 202 is a fixed value $E_R$, the intensity fluctuation component of the received signal 207 represented by the formula 4 is equal to $(A-B)[E_S^2(t)-E_R^2]$. Therefore, by removing the DC component of the received signal 207, the second term of the formula 4 is equal to $(A-B)[E_S^2(t)-E_{SA}^2]$. Here, $E_{SA}^2$ represents the time average value of $E_S^2(t)$. This intensity fluctuation noise component is irrelevant to $E_R^2(t)$, and thus the optical power monitor 164 can be omitted in the optical balanced receiver 100 of FIG. 17.

Furthermore, in this construction, the optical delayed interferometer 301 of the second embodiment can be used as the optical coupler 101, for example. In this case, no optical reference signal 202 is input, and thus the optical splitter 162 and the optical power monitor 164 of FIG. 15 can be omitted. From the formula 8 representing the received signal 207, the intensity fluctuation noise component is equal to $(A-B)[E_S^2(t)+E_S^2(t+T)]$. Therefore, in the construction of FIG. 16, the control circuit 132 sets the digital intensity signal 243 to a signal which is obtained by delaying the digital intensity signal 243 by T time in the digital delay line, and the signal before the delay may be used in place of the digital intensity signal 244. The digital delay line may be substituted by another device such as an analog delay line for delaying the input signals of the A/D converters 167 and 168 or the like insofar as it has the same effect.

Fifth Embodiment

Figure 17:
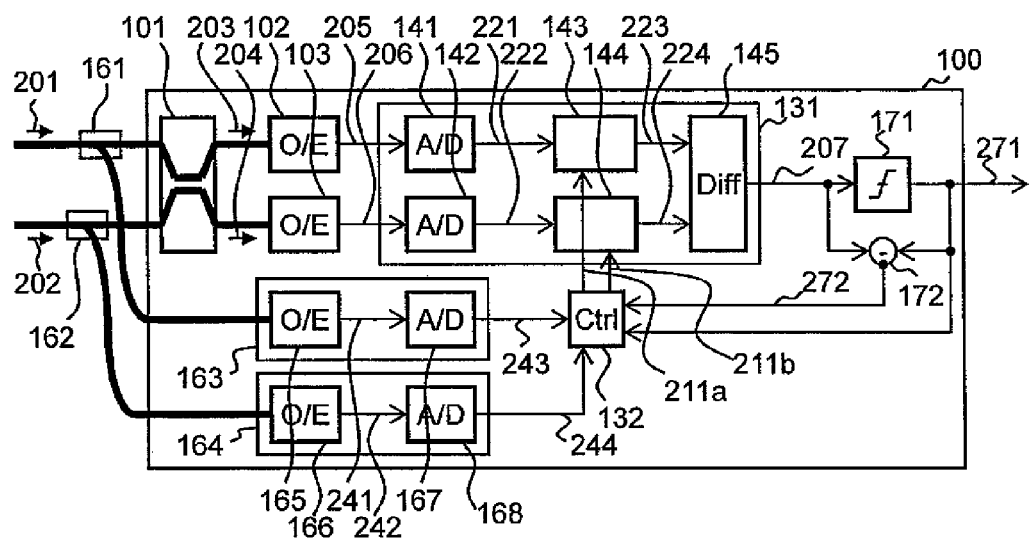
FIG. 17 is a diagram showing the construction of a fifth embodiment of the present invention.

The distortion of the received signal 207 has a component proportional to the difference between the intensity components of the optical information signal 201 and the optical reference signal 202. This distortion is caused by the extinction ratio of the optical coupler 101. FIG. 17 shows a fifth construction example of the optical balanced receiver for compensating this distortion.

The optical balanced receiver 100 of this construction is designed so that the optical balanced receiver of the first construction described above (see FIG. 6) is further provided with the optical power monitors 163 and 164, a discriminator 171 and a subtracter 172. In this construction, as in the case of the fourth embodiment (see FIG. 15), the digital intensity signals 243 and 244 are obtained from the optical information signal 201 and the optical reference signal 202 by the optical power monitors 163 and 164 and the A/D converters 167 and 168, and output to the control circuit 132. The construction from the optical coupler 101 to the output side of the received signal 207 is the same as the first construction described above, for example. Furthermore, the received signal 207 is discriminated by the discriminator 171, and a signal from which noise and distortion are removed is output as a discrimination signal 271 from the discriminator 171. For example, the received signal is compared with a predetermined threshold value, and the value corresponding to the signal point is output. When the optical information signal is a multilevel modulation signal based on 8 DPSK, QAM or the like, the received signal 207 also has a multilevel. In this case, the discriminator 171 treats the received signal 207 as a multilevel signal, and outputs as the discrimination signal 271 the multilevel signal from which noise and distortion are removed. The difference between the received signal 207 and the discrimination signal 271 is obtained in the subtracter 172, and output as a discrimination error signal 272 to the control circuit 132. In a case where the received signal 207 has no distortion, when the time average of the discrimination error signal 272 is calculated every signal point having an equal amplitude, the time average value is equal among the signal points. However, in a case where the received signal 207 has distortion, the time average value is not coincident among the signal points (for example, see (a) and (b) of FIG. 27). In the control circuit 132, the digital signal processors 143 and 144 may be controlled so that the time average of the discrimination error signal 272 is even among the signal points.

Figure 18:
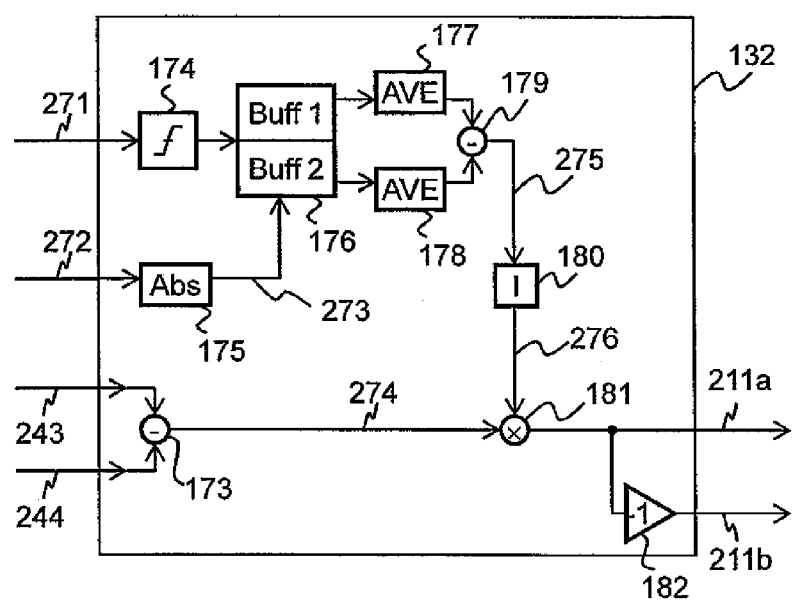
FIG. 18 is a diagram showing the construction of an embodiment of the control circuit 132 of the present invention.

FIG. 18 shows a construction example of the control circuit 132 in this construction.

The difference between the digital intensity signals 243 and 244 input to the control circuit 132 is calculated in the subtracter 173, and output as a differential intensity signal 274. The binary of the input discrimination signal 271 is determined in a binary discriminator 174, and the determination information is output to a buffer 176. The absolute value of the input discrimination error signal 272 is calculated in an absolute value calculating circuit 175, and output as an absolute error signal 273 to the buffer 176. The buffer 176 has two buffers, for example, and accumulates the absolute error signal 273 into the different buffers in accordance with the determination information of the binary discriminator 174. In the case of the multilevel modulation, the multilevel determination may be performed in the discriminator 174, and the absolute error signal 273 may be accumulated in plural buffers corresponding to respective signal points. The signal accumulated in each buffer is averaged in an averaging circuit 177, 178 to obtain an average value, and the difference between the average values obtained in the averaging circuits 177 and 178 is taken in a subtracter 179 and output as a distortion signal 275. The distortion signal 275 is time-integrated in an integrator 180, and output as a distortion detection signal 276. The distortion detection signal 276 and the differential intensity signal 274 are multiplied by each other in a multiplier 181, and output as a control signal 211a. The control signal 211a is split into two signals. One signal of the control signal 211a is used as an output of the control circuit 132, and the other signal of the control signal 211a is inverted in sign by an inverter 181, and output as a control signal 211b from the control circuit 132.

In the optical balanced receiver 100 (see FIG. 17) having the control circuit 132 of this construction, the digital signal processors 143 and 144 are set as subtracters to subtract the control signals 211a and 211b from the digital signals 221 and 222 respectively, and output the subtraction resultant signals as compensated digital detection signals 223 and 224. According to this construction, the distortion of the received signal 207 which is proportional to the difference in intensity component between the optical information signal 201 and the optical reference signal 202 can be removed.

Sixth Embodiment

Figure 19:
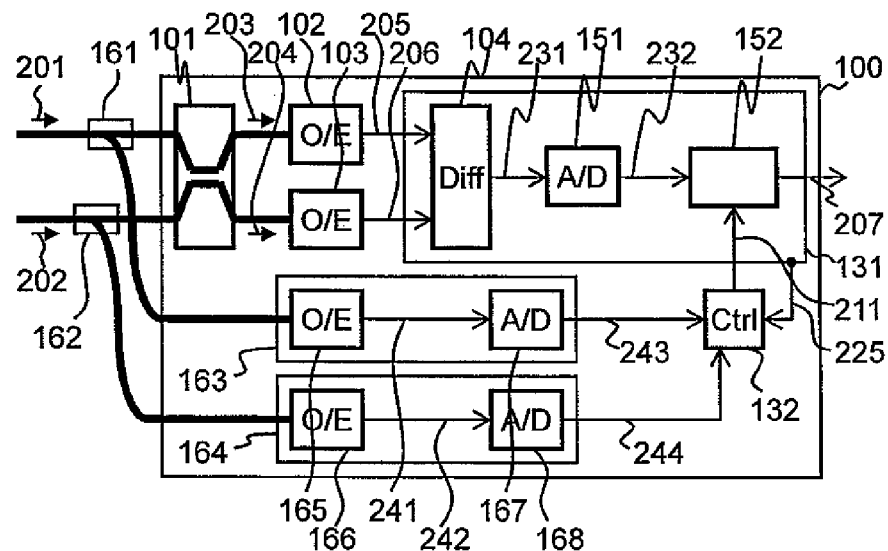
FIG. 19 is a diagram showing the construction of a sixth embodiment of the present invention.

FIG. 19 shows a fifth construction example of the optical balanced receiver.

The optical balanced receiver 100 of this construction is designed so that the optical balanced receiver 100 of the third embodiment shown in FIG. 13 is added with the optical power monitors 163 and 164 of the fourth embodiment. In this construction, the optical information signal 201 and the optical reference signal 202 are respectively split into two signals in the optical splitters 161 and 162 such as optical couplers or the like. The split two optical information signals 201 are input to the optical coupler 101 and the optical power monitor 163, and the split two optical reference signals 202 are input to the optical coupler 101 and the optical power monitor 164. In the optical power monitors 163 and 164, the photodetectors 165 and 166 receive the input optical signals, and output as detection intensity signals 241 and 242 electrical signals whose amplitudes are dependent on the intensities of the input optical signals. The detection intensity signals 241 and 242 are quantized and digitalized in the A/D converters 167 and 168, and output as digital intensity signals 243 and 244 to the control circuit 132. The construction from the optical coupler 101 to the output side of the received signal 207 is the same as the third embodiment described above, for example. When both the optical information signal 201 and the optical reference signal 202 are modulated signals, it is required to equalize the delay amounts which have been imposed until the two optical signals are input to the optical coupler 101.

When the delays of the detection intensity signals 241 and 242 are compensated, it may be desired that the optical information signal 201 and the optical reference signal 202 are subjected to intensity modulation and the modulation timings of the detection intensity signals 241 and 242 can be detected. However, if the sampling timing of each of the three A/D converters 151, 167 and 168 is made coincident with the modulation timing of the optical information signal 201 or the optical reference signal 202, the delays of the digital difference signal 232 and the detection intensity signals 241 and 242 are not required to be compensated. As a method of implementing the foregoing operation may be adopted a method of perfectly match the lengths of the three paths from the optical splitters 161 and 162 to the A/D converters 151, 167 and 168 with one another, or a method of delaying the above three signals through the digital signal processing so as to match the timing among these signals. In addition to the above methods, the compensation of the relative delay of each of the difference signal 231 and the detection intensity signals 241 and 242 may be implemented by delay adjustment of the sampling clocks of the A/D converters 151, 167 and 168 or delay adjustment of the digital difference signal 232 and the digital intensity signals 243 and 244.

Figure 20:
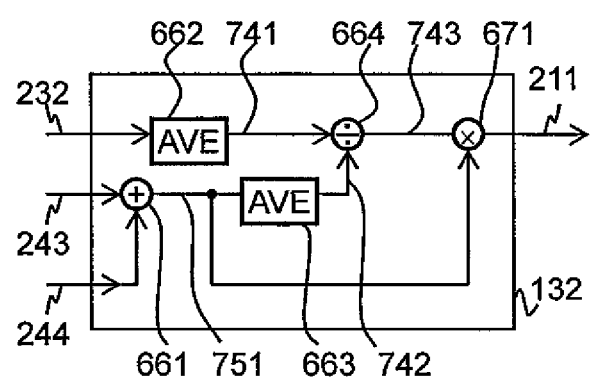
FIG. 20 is a diagram showing the construction of an embodiment of the control circuit 132 of the present invention.

FIG. 20 shows an example of the construction of the control circuit 132 of this embodiment.

An adder 661 outputs the sum of the digital intensity signals 243 and 244 as an intensity fluctuation noise signal 751. The intensity fluctuation noise signal 751 is subjected to time averaging in an averaging circuit 663, and the time-averaged signal concerned is output as an average intensity fluctuation noise signal 742. Furthermore, the digital difference signal 232 is input as the observation signal 225 into the control circuit 132, and an averaging circuit 662 outputs the time average of the digital difference signal 232 as an average received signal 741. The average received signal 741 and the average intensity fluctuation noise signal 742 are input to a divider 664, and an amplitude difference signal 743 obtained by dividing the average received signal 741 by the average intensity fluctuation noise signal 742 is output from the divider 664. This amplitude difference signal 743 is a signal representing the difference in amplitude between the detection signals 205 and 206. The amplitude difference signal 743 and the intensity fluctuation noise signal 751 are input to a multiplier 671, and the multiplication of these two signals is output as a control signal 211. This signal represents the intensity fluctuation component $(A-B)[E_S^2(t)+E_R^2(t)]$ contained in the digital difference signal 232. Therefore, in the optical balanced receiver 100 (FIG. 19) having the control circuit 132 of FIG. 20, if the subtracter for subtracting the control signal 211 from the digital difference signal 232 and outputting the subtraction resultant signal is set as the digital signal processor 152, the intensity fluctuation noise component could be removed from the received signal 207.

The control circuit 132 of this construction performs the feedforward compensation by using the digital differential signal 232 as the observation signal 225. However, the control circuit 132 may perform the feedback compensation by using the received signal 207 as the observation signal 225.

When amplitude of the optical electric-field $E_R(t)$ of the optical reference signal 202 is a fixed value $E_R$, the intensity fluctuation component of the received signal 207 represented by the formula 4 is equal to $(A-B)[E_S^2(t)-E_R^2]$. Therefore, by removing the DC component of the received signal 207, the second term of the formula 4 is equal to $(A-B)[E_S^2(t)-E_{SA}^2]$. Here, $E_{SA}^2$ represents the time average value of $E_S^2(t)$. This intensity fluctuation noise component is irrelevant to $E_R^2(t)$, and thus the optical power monitor 164 can be omitted in the optical balanced receiver 100 of FIG. 19.

Figure 21:
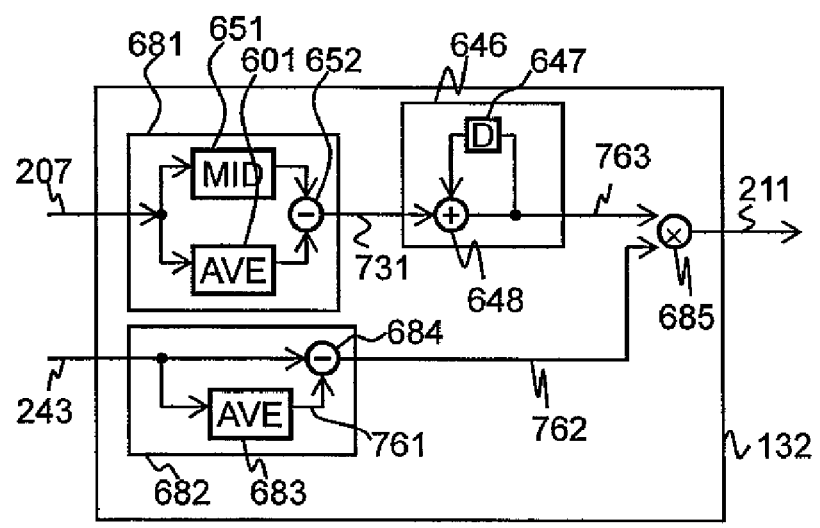
FIG. 21 is a diagram showing the construction of an embodiment of the control circuit 132 of the present invention.

FIG. 21 shows a construction example of the control circuit 132 of this embodiment.

The received signal 207 and the digital intensity signal 243 are input to the control circuit 132. The digital intensity signal 243 of these signals is first input to an intensity fluctuation calculating circuit 682. In the intensity fluctuation calculating circuit 682, for example, the time average of the digital intensity signal 243 is calculated in an averaging circuit 683, and output as an average intensity signal 761. The average intensity signal 761 is subtracted from the digital intensity signal 243 in a subtracter 684, and the time fluctuation component of the digital intensity signal 243 is output as an intensity fluctuation signal 762 from the intensity fluctuation calculating circuit 682.

The received signal 207 input to the control circuit 132 is first input to a distribution detecting circuit 681. In the distribution detecting circuit 681, a median value calculating circuit 651 outputs the median value of the received signal 207, and a time averaging circuit 601 outputs the time average value of the received signal 207. Furthermore, a subtracter 652 outputs the difference between the above two output signals as a difference signal 731.

The difference signal 731 is time-integrated in an integrating circuit 646 having a digital delay unit 647 and an adder 648, for example, and output as an integration difference signal 763. The integration difference signal 763 and the intensity fluctuation signal 762 are input to a multiplier 685, and the multiplication of these two signals is output as a control signal 211 from the multiplier 685.

In this construction, the integration difference signal 763 and the intensity fluctuation signal 762 correspond to (A−B) $[E_S^2(t)-E_R^2]$ of the formula 4 respectively, and the control signal 211 is a signal representing (A−B) and $[E_S^2(t)-E_{SA}^2]$. Therefore, if the digital signal processor 152 is set as a subtracter and the control signal 211 is subtracted from the digital difference signal 232 in the optical balanced receiver 100 of FIG. 19, the intensity fluctuation noise component could be removed from the received signal 207.

In this construction example, the optical delayed interferometer 301 of the second embodiment may be used as the optical coupler 101. In this case, no optical reference signal 202 is input, and thus the optical splitter 162 and the optical power monitor 164 of FIG. 19 are omitted. Furthermore, the intensity fluctuation noise component of the received signal 207 is represented by (A−B) and $[E_S^2(t)+E_S^2(t+T)]$ on the formula 8. Therefore, in the construction of FIG. 20, the control circuit 132 may delay the digital intensity signal 243 by T time in the digital delay line and use the delayed digital intensity signal 243 in place of the digital intensity signal 244.

Seventh Embodiment

Figure 22:
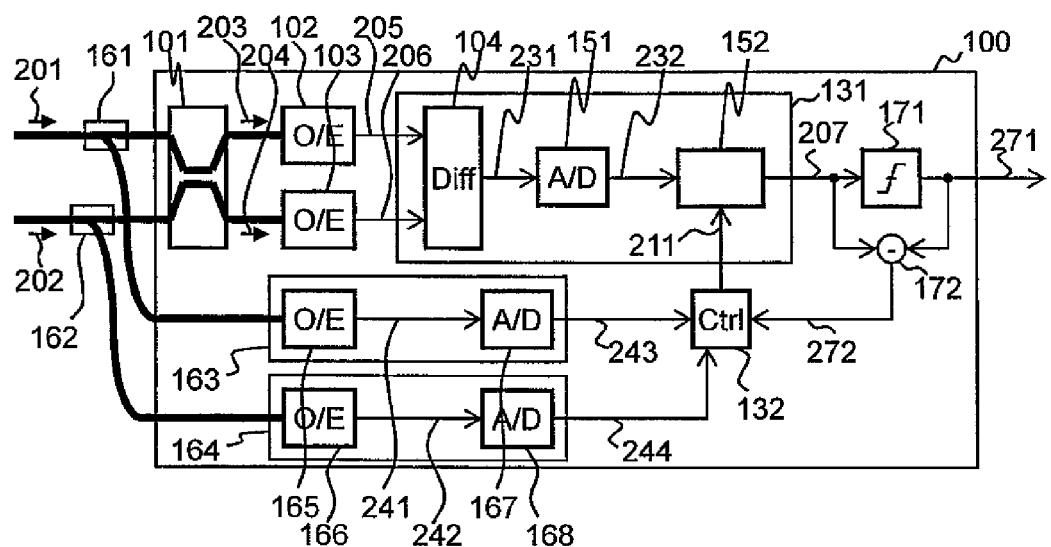
FIG. 22 is a diagram showing the construction of a seventh embodiment of the present invention.

The distortion of the received signal 207 contains a component proportional to the difference in intensity component between the optical information signal 201 and the optical reference signal 202. This distortion is caused by the extinction ratio of the optical coupler 101 or the like. FIG. 22 shows a seventh construction example of the optical balanced receiver for compensating this distortion.

The optical balanced receiver 100 of this construction is designed so that the optical balanced receiver of the third construction described above (see FIG. 14) is further provided with optical power monitors 163 and 164, a discriminator 171 and a subtracter 172. In this construction, as in the case of the sixth embodiment (see FIG. 19), the digital intensity signals 243 and 244 are obtained from the optical information signal 201 and the optical reference signal 202 by the optical power monitors 163 and 164 and the A/D converters 167 and 168, and output to the control circuit 132. Furthermore, the construction from the optical coupler 101 to the output side of the received signal 207 is the same as the third embodiment described above, for example.

The received signal 207 is discriminated by the discriminator 171, and a signal from which noise and distortion are removed is output as a discrimination signal 271 from the discriminator 171. When the optical information signal is a multilevel modulation signal based on 8 DPSK, QAM or the like, the received signal 207 also has a multilevel. In this case, the discriminator 171 treats the received signal 207 as a multilevel signal, and a multilevel signal from which noise and distortion are removed is output as the discrimination signal 271. The difference between the received signal 207 and the discrimination signal 271 is obtained in the subtracter 172, and output as a discrimination error signal 272 to the control circuit 132. In a case where the received signal 207 has no distortion, the time average value is equal among signal points when the time average of the discrimination error signal 272 is obtained every signal point having an equal amplitude. However, in a case where the received signal 207 has distortion, the time average values of the signal points are not coincident with one another. The control circuit 132 may control the digital signal processor 152 so that the time average of the discrimination error signal 272 is uniform among the signal points. With respect to the discriminator 171 and the error difference signal 272, the same as the fifth embodiment described above is applied.

The control circuit of the fifth embodiment (see FIG. 18), for example, can be used as the control circuit 132 of this construction. Here, the control signal 211a output from the control circuit 132 of FIG. 18 is set as the control signal 211 input to the digital signal processor 152 of FIG. 22. The inverter 182 may be omitted. The digital signal processor 152 may be set as a subtracter to subtract the control signal 211 from the digital difference signal 232 and output the received signal 207. According to this construction, the distortion of the received signal 207 which is proportional to the difference in intensity component between the optical information signal 201 and the optical reference signal 202 can be removed.

Eight Embodiment

Figure 23:
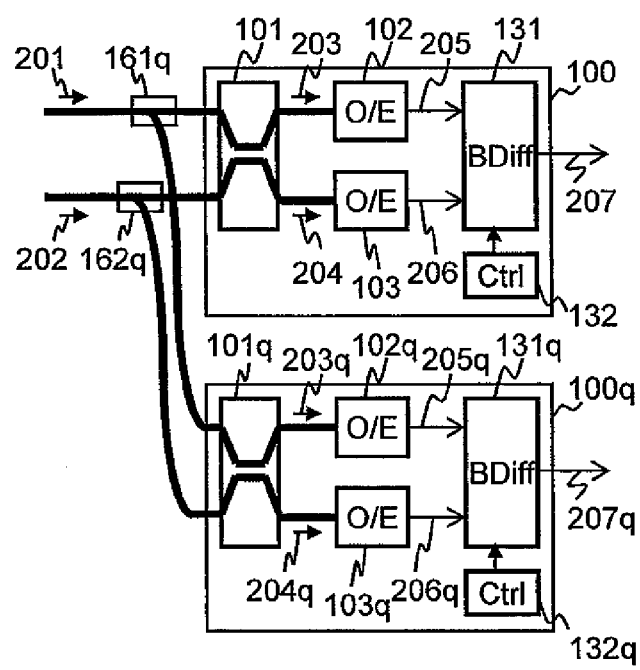
FIG. 23 is a diagram showing the basic construction of an optical IQ receiver constructed by optical balance receivers.

In the first embodiment, the received signal 207 is represented by the formula 4. The first term of the formula 4 contains cos $\phi_F(t)$, and the amplitude of the received signal 207 varies in accordance with the cos component of $\phi_F(t)$. However, as is apparent from the relational expression of a trigonometric function cos θ=cos(−θ), it is impossible to uniquely determine $\phi_F(t)$ from the amplitude of the received signal 207 except for θ=0 or π. An optical receiver which solves this problem is an optical IQ receiver shown in FIG. 23.

The optical IQ receiver has two optical balanced receivers 100 and 100q, and the optical balanced receiver of each embodiment described above can be applied. Any construction of the first to seventh embodiments can be adopted for the optical balanced receivers 100 and 100q of FIG. 23. Furthermore, the optical IQ receiver is further provided with optical splitters 161q and 162q.

In this construction, the optical information signal 201 and the optical reference signal 202 are respectively split into two signals by the optical splitters 161q and 162q such as optical couplers or the like, and the respective split two signals are input to the optical balanced receivers 100 and 100q. In the optical balanced receivers 100 and 100 q, the optical couplers 101 and 101q combine the optical information signal 201 and the optical reference signal 202 at the interference phases which are orthogonal to each other. The optical coupler 101 outputs optical interfering signals 203 and 204, and the optical coupler 101q outputs optical interfering signals 203q and 204q. These optical interfering signals 203, 204, 203q and 204q are received by photodetectors 102, 103, 102q and 103q respectively to be converted to detection signals 205, 206, 205q and 206q whose amplitudes correspond to the interference intensities thereof, and then output. The difference between the detection signals 205 and 206 is output as the received signal 207 from the balance compensation type difference device 131, and the difference between the detection signals 205q and 206q is likewise output as the received signal 207q from the balance compensation type difference device 131q. In this construction, when the detection signals 205 and 206 are subjected to different attenuations or amplifications and to be multiplied by A and B respectively and the detection signals 205q and 206q are likewise multiplied by C and D respectively, the received signal 207 is represented by the formula 4, and the received signal 207q is represented by the following $S_{d2}$:

$$S_d=2(C+D)E_S(t)E_R(t)\sin(\omega_F t+\phi_F(t)-\phi)+(C-D)[E_S^2(t)+E_R^2(t)]$$ [Formula 11]

When the receiver balances of the optical balanced receivers 100 and 100q are established, A=B=C=D is satisfied in the formula 4 and the formula 11, and the intensity fluctuation noises of the second terms of the respective formulas are removed. As a result, the received signals 207 and 207q are represented by the first terms of the formula 4 and the formula 11 respectively, and they vary in accordance with the cos-component and the sin-component of $\phi_F(t)$. $\phi_F(t)$ can be uniquely determined from the two received signals 207 and 207q. Specifically, when the received signal 207 containing the cos component of $\phi_F(t)$ is represented by I and the received signal 207q containing the sin component of $\phi_F(t)$ is represented by Q, $\phi_F(t)$ can be calculated as Arctan(Q,I).

When the optical balanced receiver of the present invention is applied to the optical IQ receiver, any optical balanced receiver of the first to fifth embodiments may be used as the optical balanced receivers 100 and 100q of FIG. 20. In each case, the optical delayed interferometer 301 of the second embodiment may be used as the optical couplers 101 and 101q. Furthermore, when the optical balanced receivers of the fourth and fifth embodiments which have the optical powder monitors 163 and 164 shown in FIGS. 15 and 17 are applied, the respective optical power monitors 163 and 164 of the two optical balanced receivers 100 and 100q can be shared. For example, the construction of FIG. 20 may be further provided with the optical power monitors 163 and 164 of FIG. 15, and separately from the optical splitters 161q and 162q, the optical information signal 201 and the optical reference signal 202 are split and input to the optical power monitors 163 and 164, and the digital intensity signals 243 and 244 output from the optical power monitors 163 and 164 may be output to both the control circuits 132 and 132q. In the optical IQ receiver of FIG. 20, the two control circuits 132 and 132q are provided. However, lots of processing are shared, and thus the control circuits may be unified into one control circuit 532.

(Compensation/Correction of Received Signal)

Figure 24:
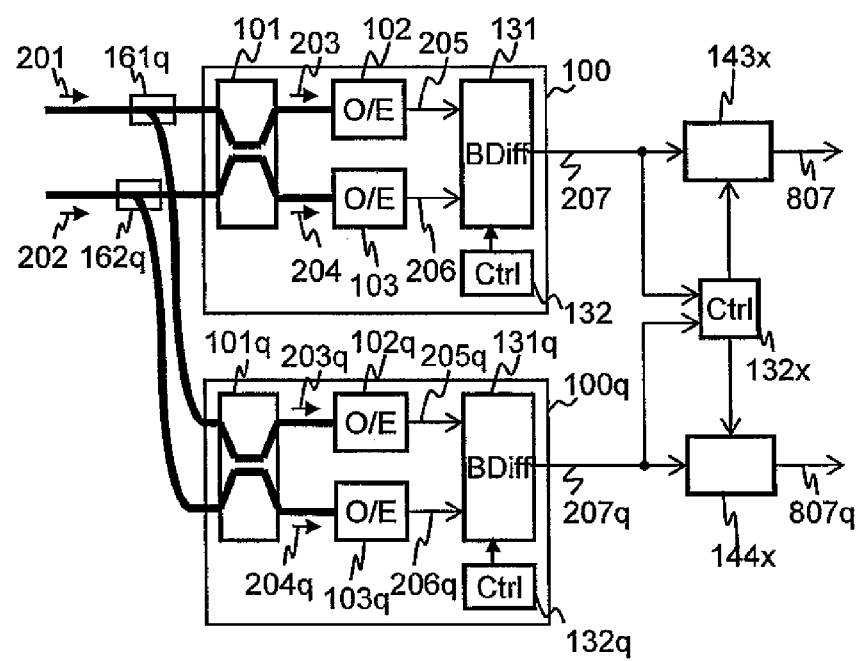
FIG. 24 is a diagram showing the construction of an eighth embodiment of the present invention.

The received signals 207 and 207q may be different in amplitude and/or delay on the basis of only the receiver balance of each of the optical balanced receivers 100 and 100q in the optical IQ receiver, and thus $\phi_F(t)$ cannot be calculated in some cases even when Arctan of the two signals is calculated. Therefore, in this embodiment, the amplitude and/or delay of the received signals 207 and 207q are equally compensated or corrected. FIG. 24 shows a construction for this compensation or correction. This construction has the optical IQ receiver shown in FIG. 23, two digital signal processors 143x and 144x and a control circuit 132x.

In this construction, the received signals 207 and 207q output from the optical IQ receiver are input to the digital signal processors 143x and 144x respectively to compensate the difference in amplitude and/or delay between the receives signals 207 and 207q in accordance with the control signal output from the control circuit 132x, and compensated received signals 807 and 807q are output from the digital signal processors 143x and 144x. The control circuit 132 and the digital signal processors 143 and 144 of the first and second embodiments may be diverted as the control circuit 132x and the digital signal processors 143x and 144x. For example, if there are used the control circuit 132x in which the digital detection signals 221 and 222 input to the control circuit 132 of FIG. 7 are set as the received signals 207 and 207q and digital signal processors 143x and 144x for dividing the received signals 207 and 207q by the control signals 211a and 211b from the control circuit 132x respectively, the amplitudes of the received signals 207 and 207q could be compensated.

Likewise, if there are used the control circuit 132x in which the digital detection signals 221 and 222 input to the control circuit 132 of FIG. 8 are set as the received signals 207 and 207q and the digital signal processors 143x and 144x in which the digital detection signals 221 and 222 input to the digital signal processors 143 and 144 of FIG. 9 are set as the received signals 207 and 207q, the delays of the received signals 207 and 207q are compensated. Furthermore, the digital signal processors 143x and 144x may be installed in the digital signal processors equipped in the balance compensation type difference devices 131 and 131q.

Figure 27:
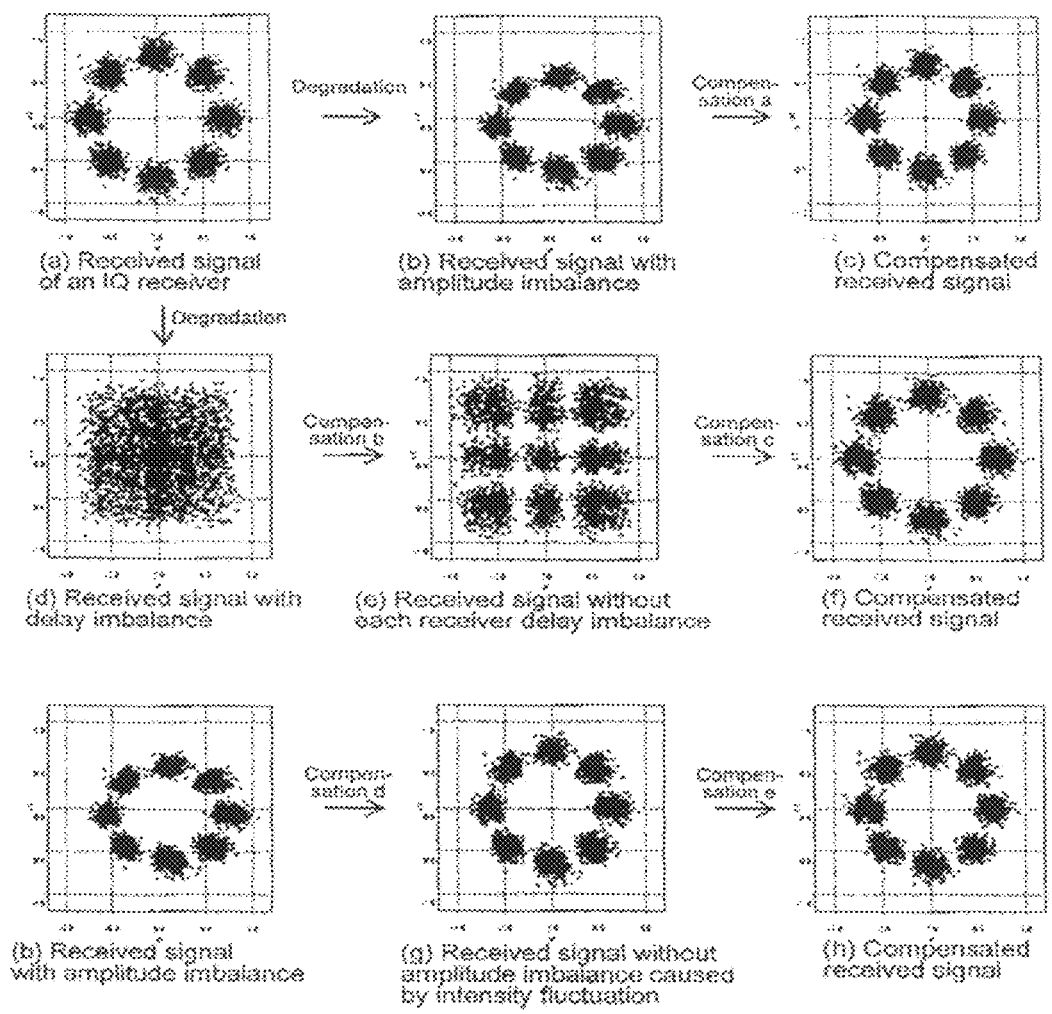
FIG. 27 is a diagram showing an effect of the present invention in the optical IQ receiver.

A simulation result of the effect of this invention will be described with reference to FIG. 27. In FIG. 27, (a) to (f) represent constellation maps in which the compensated received signals 807 and 807q are plotted as an abscissa axis component and an ordinate axis component when an optical 8-level phase-modulated signal is received by an optical IQ receiver in which the optical couplers 101 and 101q of FIG. 24 are set to the optical delayed interferometers 301. In FIG. 27, (a) represents a constellation map having no distortion when the receiver balance of each of the optical balanced receivers 100 and 100q is established. In this constellation map, a distribution of eight signal points which are concentrically arranged at even intervals can be observed. However, when the digital detection signals 221, 222, 221q and 222q are different in amplitude from one another, the constellation map is distorted as shown in (b) of FIG. 27, and the eight signal points is distributed so as not to be concentrically arranged at even intervals. Therefore, for example when the optical balanced receiver of FIG. 6 in which the digital signal processors 143 and 144 are set as dividers is set as the optical balanced receivers 100, 100q of the optical IQ receiver, the digital signal processors 143x and 144x are set as dividers and the control circuits 132, 132q and 132x are set as the control circuits of FIG. 7, the digital detection signals 221, 222, 221q and 222q are corrected to be equal in amplitude to one another, and a constellation map having no distortion as shown in (c) of FIG. 27 is obtained.

In a case where the optical balanced receiver of the optical IQ receiver is the optical balanced receiver of the sixth embodiment (see FIG. 19), a constellation map as shown in (g) of FIG. 27 is obtained when the intensity fluctuation noise signal is removed by using the sum of the intensity components of the optical information signal 201 and the optical reference signal 202. This constellation map is compensated in offset, however, the distortion of the signal points is not removed. This is the distortion corresponding to the differential intensity signal corresponding to the difference between the intensity components of the optical information signal 201 and the optical reference signal 202. Therefore, by further using the digital signal processor 152 of the seventh embodiment (see FIG. 22) and the control circuit 132 of FIG. 18, a constellation map having no distortion as shown in (h) of FIG. 27 is obtained.

On the other hand, when the digital detection signals 221, 222, 221q and 222q are different in delay amount from one another, the constellation map is distorted as shown in (d) of FIG. 27, and it is impossible to identify the signal points. Therefore, by using the control circuit of FIG. 11 and the digital signal processor of FIG. 9 which delays the input signal in accordance with the control signal, a constellation map as shown in (e) of FIG. 27 is obtained. In this case, the delay difference of the received signals 207 and 207q has not yet been corrected. However, when the delay between the received signals 207 and 207q is further corrected by using the digital signal processors 143x and 144x, a constellation map having no distortion as shown in (f) of FIG. 27 is obtained. As described above, by using this invention, the receiver balance can be compensated.

(Omission of Optical Power Monitoring, Etc.)

Even when the optical balanced receiver of the third or fourth embodiment is applied to the optical IQ receiver, all the optical power monitors 163 and 164 can be omitted if a given condition is satisfied. The principle will be described below.

When amplitudes of the optical electric-fields $E_S(t)$ and $E_R(t)$ of the optical information signal 201 and the optical reference signal 202 are substantially fixed temporally, the intensity fluctuation noises contained in the received signals 207 and 207q of the optical IQ receiver can be removed as DC components, and they are represented by $S_d$ and $S_{d2}$ of the following formula 12 and formula 13. Light having a fixed amplitude of the optical electric-field is continuous light, phase-modulated light or the like. However, in this embodiment, if amplitude of the optical electric-field is fixed at the sampling timing of the A/D converter, intensity-modulated light can be used. For example, this embodiment can be applied even when RZ-pulsed phase-modulated light is used.

$$S_{d2} \approx 2E_S(t)E_R(t)\cos(\omega_F t + \phi_F(t) - \phi) \quad \text{[Formula 12]}$$

$$S_{d2} \approx 2E_S(t)E_R(t)\sin(\omega_F t + \phi_F(t) - \phi) \quad \text{[Formula 13]}$$

Here, by calculating the square root of the sum of squares of the two formulas (formula 12 and formula 13), the following formula 14 is obtained, and $2E_S(t)E_R(t)$ can be calculated:

$$D = \sqrt{S_d^2 + S_{d2}^2} \approx 2E_S(t)E_R(t) \quad \text{[Formula 14]}$$

Here, when amplitudes of the optical electric-fields $E_S(t)$ and $E_R(t)$ are substantially equal to each other, the following formula 15 is satisfied. For example when the optical delayed interferometer 301 is used as the optical couplers 101 and 101q, the optical signal to be combined with the optical information signal 201 is not the optical reference signal 201, but the delayed optical information signal 201, and thus the above condition is satisfied.

$$D \approx 2E^2(t) \approx E_S^2(t) + E_R^2(t) \quad \text{[Formula 15]}$$

Accordingly, an approximate value corresponding to the optical intensity $E_S^2(t) + E_R^2(t)$ can be calculated from the received signals 207 and 207q.

In the optical IQ receiver using the optical balanced receiver 100 of the third embodiment, the control circuit 132 of FIG. 16 calculates $E_S^2(t) + E_R^2(t)$ from the digital intensity signals 243 and 244. However, if D of the formula 15 as the approximate value of $E_S^2(t) + E_R^2(t)$ is calculated from the received signals 207 and 207q and used, the digital intensity signals 243 and 244 are not required, and thus the optical power monitors 163 and 164 shown in FIG. 15 can be omitted.

Figure 25:
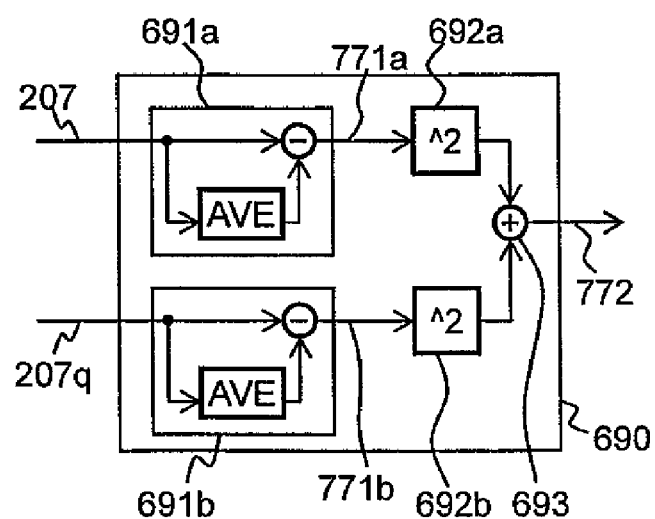
FIG. 25 is a diagram showing the construction of an embodiment of an optical intensity calculating circuit.

FIG. 25 shows the construction of an optical intensity calculating circuit 690 for calculating the intensity fluctuation noise signal 772 represented by $E_S^2(t) + E_R^2(t)$ from the received signals 207 and 207q.

The received signals 207 and 207q output from the optical balanced receivers 100 and 100q or the digital difference signals 232 thereof are input to DC removing circuits 691a and 691b, and the AC components thereof are output as AC digital signals 771a and 771b. The AC digital signals 771a and 771b are respectively multiplied by themselves in square circuits 692a and 692b, added with each other in an adder 693, and then output as an optical intensity fluctuation noise signal 772.

Figure 26:
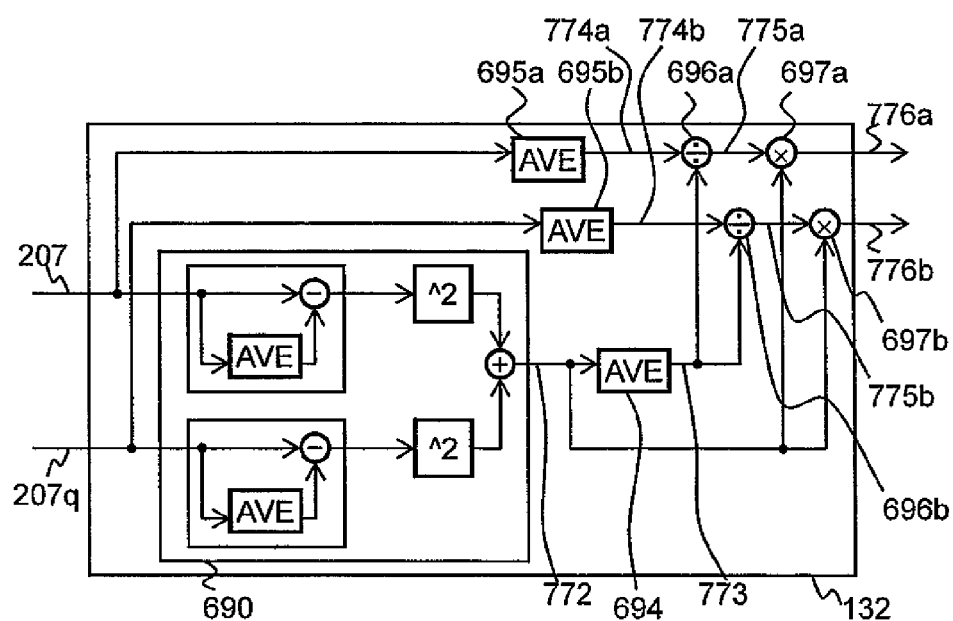
FIG. 26 is a diagram showing the construction of an embodiment of a control circuit in the optical IQ receiver.

FIG. 26 shows the construction of the control circuit 132 having the optical intensity calculating circuit 690 of FIG. 25 in the optical IQ receiver using the optical balanced receiver 100 of the fourth embodiment.

The received signals 207 and 207q for outputting the optical balanced receivers 100 and 100q or the respective digital difference signals 232 thereof are input to the optical intensity calculating circuit 690 to calculate the optical intensity noise signal 772. The optical intensity noise signal 772 is input to the averaging circuit 694, and the time average value thereof is output as an average intensity fluctuation noise signal 773. This corresponds to the average intensity fluctuation noise signal 742 of FIG. 18. The received signals 207 and 207q are input to averaging circuits 695a and 695b respectively, and the time averages thereof are output as average received signals 774a and 774b. The average received signals 774a and 774b are input to dividers 696a and 696b together with the average intensity fluctuation noise signal 773, and amplitude difference signals 775a and 775b which are obtained by dividing the average received signals 774a and 774b by the average intensity fluctuation noise signal 773 are output from the dividers 696a and 696b, respectively. The amplitude difference signals 775a and 775b are respectively multiplied by the optical intensity noise signal 772 in multipliers 697a and 697b, and output as intensity fluctuation noise signals 776a and 776b, respectively.

In a case where each of the optical balanced receivers 100 and 110q of the optical IQ receiver is set as the optical balanced receiver of FIG. 19, if the intensity fluctuation noise signals 776a and 776b output from the control circuit 132 of FIG. 26 are set as the respective control signals 211 for the optical balanced receivers 100 and 100q and the digital signal processors 152 thereof are set as subtracters for subtracting the control signals 211 from the digital differential signals 232 respectively, the intensity fluctuation noise components can be removed from the received signals 207 and 207q.

The present invention is applicable to optical phase receiving, etc. in the optical multilevel modulation, for example.

What is claimed is:
1. An optical balanced receiver comprising:
an optical coupler for combining input optical information signal and optical reference signal and outputting two optical interfering signals whose phases are opposite to each other;
two photodetectors for receiving the two optical interfering signals and outputting, as detection signals, electrical signals having amplitudes corresponding to the interference intensities of the received optical interfering signals;
a balance compensation type difference device for compensating an intensity fluctuation component added to a difference signal of the two detection signals due to the difference in amplitude and/or delay between the detection signals output from the two photodetectors in accordance with an input control signal, and outputting the compensated difference signal of the two detection signals; and
a control circuit for outputting the control signal to the balance compensation type difference device,
wherein the balance compensation type difference device comprises:
an analog-to-digital converter for converting the difference signal to a digital signal; and
a digital signal processor for compensating the amplitude and/or delay of converted signal in accordance with the control signal from the control circuit.

2. The optical balanced receiver according to claim 1, wherein the balance compensation type difference device further comprises:
   a difference device for obtaining the difference signal between the two detection signals.

3. The optical balanced receiver according to claim 2, further comprising:
   an optical splitter for splitting the optical information signal into two signals and outputting one optical information signal of the split two signals to the optical coupler;
   an optical power monitor for receiving the other optical information signal of the split two signals, converting an intensity component of the other optical information signal to an electrical signal and outputting an intensity signal;
   a second optical splitter for splitting the optical reference signal into two signals and outputting one optical reference signal of the split two signals to the optical coupler;
   a second optical power monitor for receiving the other optical reference signal, converting an intensity component of the other optical reference signal to an electrical signal, and outputting an intensity signal; and
   third and fourth analog-to-digital converters for converting the intensity signals output from the two optical power monitors to digital signals and outputting the digital signals to the control circuit,
   wherein the control circuit observes the output signals of the third and fourth analog-to-digital converters and the output signal of the analog-to-digital converter or the digital signal processor of the balance compensation type difference device, calculates an intensity fluctuation noise component corresponding to the intensity fluctuation of the optical information signal and/or the optical reference signal contained in the output signal of the difference device on the basis of the two output signals, generates a control signal to reduce the intensity fluctuation noise component and outputs the generated control signal to the digital signal processor.

4. The optical balanced receiver according to claim 2, further comprising:
   an optical splitter for splitting the optical information signal into two signals and outputting one optical information signal of the two split signals to the optical coupler;
   an optical power monitor for receiving the other optical information signal of the two split signals, converting an intensity component of the other optical information signal to an electrical signal and outputting an intensity signal; and
   a third analog-to-digital converter for converting the intensity signal output from the optical power monitor to a digital signal and outputting the digital signal to the control circuit,
   wherein
   the control circuit removes a DC component from the output signal of the third analog-to-digital converter to calculate an intensity fluctuation signal, calculates the product of the intensity fluctuation signal and the difference between a median value and an average value of the output signal of the analog-to-digital converter or the digital signal processor of the balance compensation type difference device, thereby generating a control signal, and
   the digital signal processor subtracts the control signal from the digital signal output from the analog-to-digital converter.

5. The optical balanced receiver according to claim 3, further comprising:
   a discriminator for discriminating a value corresponding to a signal point on the basis of the output signal of the digital signal processor and outputting a discrimination signal from which noise and distortion are removed; and
   a subtracter for obtaining the difference between the received signal and the discrimination signal and outputting an error signal,
   wherein
   the control circuit calculates a differential intensity signal corresponding to the difference between the output signals of the third and fourth analog-to-digital converters, calculates an average of the error signal every discrimination signal, calculates the difference in the average every discrimination signal as a distortion signal, and outputs a control signal corresponding to the product between a distortion detection signal increasing or decreasing in accordance with the distortion signal and the differential intensity signal, and
   the digital signal processor subtracts the control signal from the input signal and outputs a subtraction resultant signal.

* * * * *